US010493689B1

(12) United States Patent
Lyons et al.

(10) Patent No.: US 10,493,689 B1
(45) Date of Patent: Dec. 3, 2019

(54) METHODS FOR FORMING THERMOPLASTIC PARTS WITH FREEFORM TOOLING

(75) Inventors: Brett I. Lyons, Chicago, IL (US); Aaron W. Bartel, Mountlake Terrrace, WA (US); David Eric Gideon, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 1315 days.

(21) Appl. No.: 12/875,124

(22) Filed: Sep. 2, 2010

(51) Int. Cl.
*B29C 64/10* (2017.01)
*B33Y 10/00* (2015.01)

(52) U.S. Cl.
CPC .............. *B29C 64/10* (2017.08); *B33Y 10/00* (2014.12)

(58) Field of Classification Search
CPC ...................................................... B29C 64/10
USPC ........................................................ 264/308
See application file for complete search history.

(56) References Cited

U.S. PATENT DOCUMENTS

| | | | | |
|---|---|---|---|---|
| 3,970,495 | A * | 7/1976 | Ashton | B29C 33/52 138/144 |
| 4,938,816 | A | 7/1990 | Beaman et al. | |
| 5,121,329 | A | 6/1992 | Crump | |
| 5,204,055 | A | 4/1993 | Sachs et al. | |
| 5,259,901 | A | 11/1993 | Davis et al. | |
| 5,348,798 | A * | 9/1994 | Berghuis | B29C 33/52 264/258 |
| 5,853,651 | A * | 12/1998 | Lindsay et al. | 264/512 |
| 6,070,107 | A * | 5/2000 | Lombardi et al. | 700/119 |
| 6,099,787 | A * | 8/2000 | Melisaris | B29C 67/0066 264/401 |
| 6,279,425 | B1 * | 8/2001 | Cicotte | 76/107.1 |
| 6,344,160 | B1 * | 2/2002 | Holtzberg | 264/102 |
| 6,630,093 | B1 | 10/2003 | Jones | |
| 6,713,008 | B1 * | 3/2004 | Teeter | B29C 70/025 264/240 |
| 6,828,373 | B2 | 12/2004 | Artz et al. | |
| 2004/0026015 | A1 * | 2/2004 | Frantz et al. | 156/203 |
| 2004/0048027 | A1 | 3/2004 | Hayes et al. | |
| 2005/0205232 | A1 * | 9/2005 | Wang | B22C 9/10 164/361 |
| 2005/0278061 | A1 | 12/2005 | DeGrange et al. | |
| 2006/0001190 | A1 * | 1/2006 | Priedeman et al. | 264/219 |
| 2007/0208447 | A1 | 9/2007 | Ostrega | |

(Continued)

FOREIGN PATENT DOCUMENTS

WO    2007138619 A1    12/2007

OTHER PUBLICATIONS

Rafix Noorani, Rapid Prototyping: Principles and Applications, 2006John Wiley & Sons, Inc, pp. 1-5, 366, and 368.*

(Continued)

*Primary Examiner* — Monica A Huson
*Assistant Examiner* — Patrick Butler

(57) ABSTRACT

In an embodiment of the disclosure, there is provided a method of prototyping a thermoplastic composite part. The method comprises fabricating one or more discardable freeform tooling elements via a rapid manufacturing process. The method further comprises forming thermoplastic composite materials into a thermoplastic composite prototype part using the one or more discardable freeform tooling elements. The method further comprises separating the thermoplastic composite prototype part from the one or more discardable freeform tooling elements.

20 Claims, 16 Drawing Sheets

(56) References Cited

U.S. PATENT DOCUMENTS

2009/0014919 A1* 1/2009 Rossfeldt ............. B22F 1/0074
264/454
2010/0121475 A1 5/2010 Lyons

OTHER PUBLICATIONS

Richard J. Lewis, Sr., Hawley's Condensed Chemical Dictionary, 1997, John Wiley & Sons, Inc., Thirteenth Edition, pp. 194, 231, 537, and 538. QD5.C5 1997 c.33.*
"ACM RapidCore," Web page <http://acmtucson.com/products/watersolublemoldsandtooling/>, 4 pages, Jul. 28, 2013 [retrieved on Aug. 17, 2017]. Retrieved from the Internet Archive Wayback Machine using the Internet: <URL: https://web.archive.org/web/20130728143212/http://acmtucson.com/products/watersolublemoldsandtooling/rapidcore.html>.*
International Search Report and the Written Opinion of the International Searching Authority, dated May 18, 2010, for PCT/US2009/063973 (corresponds to US Published Pat. Appln. 20100121475), 13 pages.

* cited by examiner

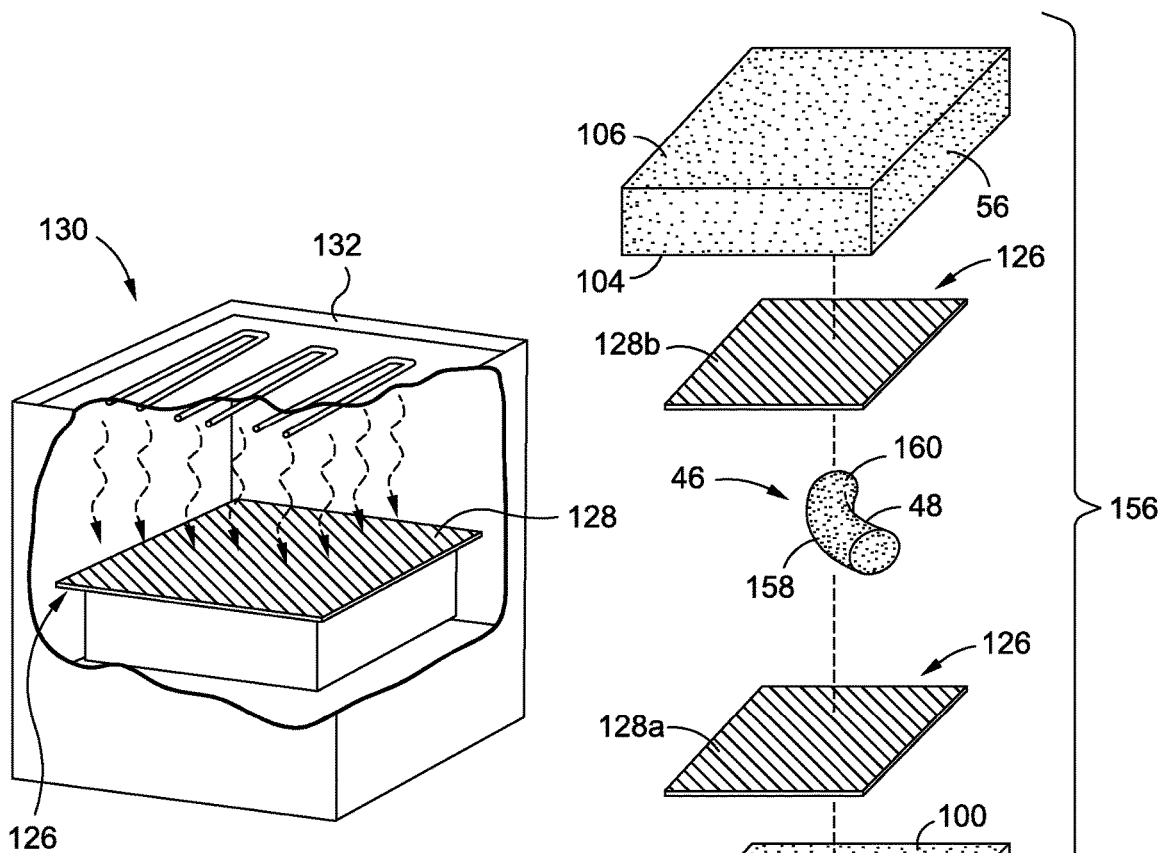
FIG. 11
FIG. 12
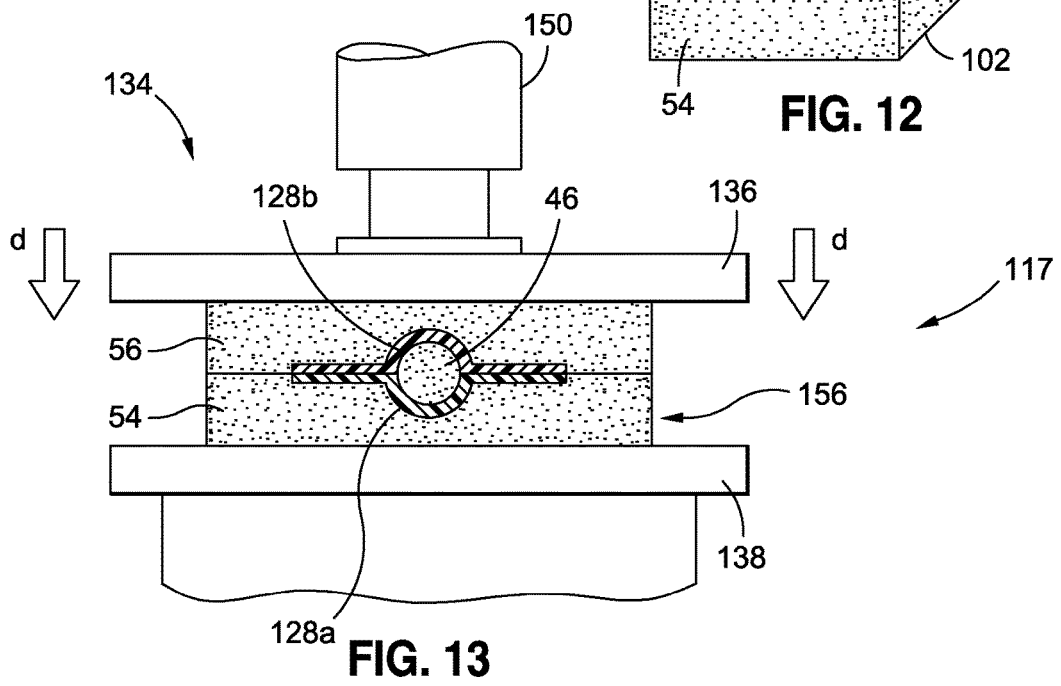
FIG. 13

METHODS FOR FORMING THERMOPLASTIC PARTS WITH FREEFORM TOOLING

CROSS-REFERENCE TO RELATED APPLICATIONS (Not Applicable)

STATEMENT RE: FEDERALLY SPONSORED RESEARCH/DEVELOPMENT (Not Applicable)

FIELD

The disclosure relates generally to manufacturing methods and systems used to fabricate composite parts, and more particularly, to manufacturing methods and systems used to fabricate thermoplastic composite parts with freeform tooling.

BACKGROUND

Thermoplastic and fiber-reinforced thermoplastic composite structures or parts are used in a wide variety of applications, including in the manufacture of aircraft, spacecraft, rotorcraft, watercraft, automobiles, trucks, and other composite structures. In aircraft construction, thermoplastic and fiber-reinforced thermoplastic composite structures or parts are used in increasing quantities to form the fuselage, wings, tail section, and other components. Creating geometrically complex, high performance, three-dimensional thermoplastic composite structures or parts typically requires multiple sets of tooling and molding operations. The fabrication of such tooling and molding is important for the design and the manufacture of thermoplastic composite structures or parts.

Stamp formed thermoplastic composite structures or parts are typically limited to planar or drafted geometry, and the production of tooling or molding for the stamp forming process can be slow and expensive. The typical method to produce tooling or molding for the stamp forming process is CNC (computer numerically controlled) machining of metals. Such CNC machining uses computer programs such as CAD (computer-aided design) or CAM (computer-aided manufacturing) to automatically execute a series of machining operations. However, such CNC machining may be a slow, labor intensive process that may only produce tooling or molding of limited geometric complexity with increased material waste. Moreover, such CNC machining to produce tooling or molding typically has a lead time of several weeks to several months and can become quite expensive, depending on the complexity of the tooling or molding desired. In addition, with such CNC machining, design changes can be expensive and time consuming.

In addition, if trapped or internal geometry is desired for a thermoplastic composite structure or part, secondary tooling is typically required to form a silicone bladder or other removable tooling detail. Such bladder molded types of parts have a limited degree of control as the bladders often require constant pressure and often do not allow for features such as multiple ribs through a cross-section.

Accordingly, there is a need in the art for an improved method and system for forming thermoplastic composite structures or parts that provide advantages over known methods and systems.

SUMMARY

This need for an improved method and system for forming thermoplastic composite structures or parts is satisfied. In an embodiment of the disclosure, there is provided a method of prototyping a thermoplastic composite part. The method comprises fabricating one or more discardable freeform tooling elements via a rapid manufacturing process. The method further comprises forming thermoplastic composite materials into a thermoplastic composite prototype part using the one or more discardable freeform tooling elements. The method further comprises separating the thermoplastic composite prototype part from the one or more discardable freeform tooling elements.

In another embodiment of the disclosure, there is provided a method of prototyping a fiber-reinforced thermoplastic composite part. The method comprises generating a three-dimensional computer-aided design (3D CAD) model of one or more discardable tooling elements for a prototype part. The method further comprises fabricating one or more discardable freeform tooling elements based on the 3D CAD model. The method further comprises forming fiber-reinforced thermoplastic composite materials into a fiber-reinforced thermoplastic composite part using the one or more discardable freeform tooling elements. The method further comprises separating the fiber-reinforced thermoplastic composite part from the one or more discardable freeform tooling elements. The method further comprises discarding the one or more discardable freeform tooling elements.

In another embodiment of the disclosure, there is provided a method for reducing inventory and inventory storage space for one or more discardable freeform tooling elements used in the manufacture of prototype parts for thermoplastic composite parts. The method comprises maintaining a three-dimensional model of one or more discardable tooling elements for a composite part. The method further comprises fabricating one or more discardable freeform tooling elements based on the three-dimensional model. The method further comprises forming thermoplastic composite materials into a thermoplastic composite part using the one or more discardable freeform tooling elements by operating a thermoplastic part forming process. The method further comprises separating the thermoplastic composite part from the one or more discardable freeform tooling elements. The method further comprises discarding the one or more discardable freeform tooling elements, resulting in reduced inventory and inventory storage space of the one or more discardable freeform tooling elements.

In another embodiment of the disclosure, there is provided a system for prototyping thermoplastic composite parts. The system comprises a computer system for generating a three-dimensional computer-aided design (3D CAD) model of one or more discardable tooling elements for a prototype part. The system further comprises a rapid manufacturing apparatus for fabricating one or more discardable freeform tooling elements based on the 3D CAD model. The system further comprises a thermoplastic part forming apparatus for forming thermoplastic composite materials into a thermoplastic composite part using the one or more discardable freeform tooling elements. The system further comprises a separating element for separating the thermoplastic composite part from the one or more discardable freeform tooling elements.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 11 is an illustration of thermoplastic composite material being heated in an infrared oven of an exemplary embodiment of a stamp forming system that may be used in embodiments of the disclosed methods and systems;

FIG. 12 is an illustration of an exploded view of a stamp form part assembly for use in an exemplary embodiment of a stamp forming apparatus that may be used in embodiments of the disclosed methods and systems;

FIG. 13 is an illustration of the stamp form part assembly being pressed in an exemplary embodiment of a stamp forming apparatus that may be used in embodiments of the disclosed methods and systems;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
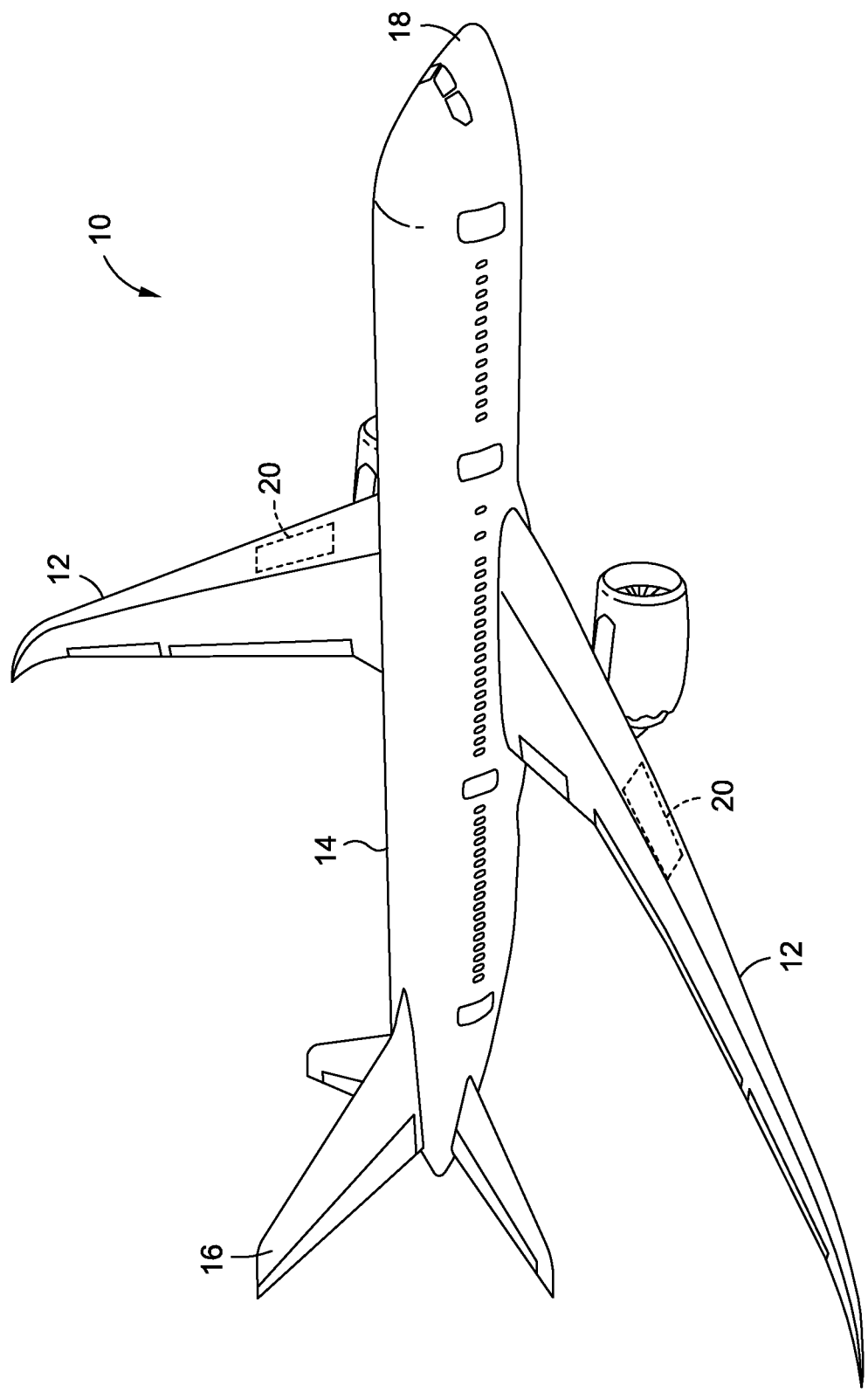
FIG. 1 is an illustration of a perspective view of an aircraft which may include a composite part or structure manufactured using one or more advantageous disclosed embodiments of the methods and systems for forming thermoplastic composite parts using one or more discardable freeform tooling elements.

FIG. 1 is an illustration of a perspective view of an aircraft 10 that may be made from composite and/or metallic parts that may be used on portions of the aircraft 10, including but not limited to, wings 12, a fuselage 14, a tail 16, and a nose 18. The aircraft 10 may include one or more composite structures 20 manufactured using one or more advantageous disclosed embodiments of the methods and systems discussed below. The methods and systems of the disclosure are used for manufacturing a thermoplastic composite part 22, preferably a thermoplastic composite prototype part 44 (see FIG. 15), and more preferably, a fiber-reinforced thermoplastic composite part 45 (see FIG. 15), with one or more discardable freeform tooling elements 24 (see FIGS. 8 and 15). Although the composite structure 20 is shown in an exemplary embodiment as used in the aircraft 10, the composite structure 20 may also be used in other articles (not shown), such as spacecraft, rotorcraft, watercraft, automobiles, trucks, sporting goods, windmills, tubing and ducting used in petrochemical systems, medical devices, and other suitable composite structures.

Figure 2:
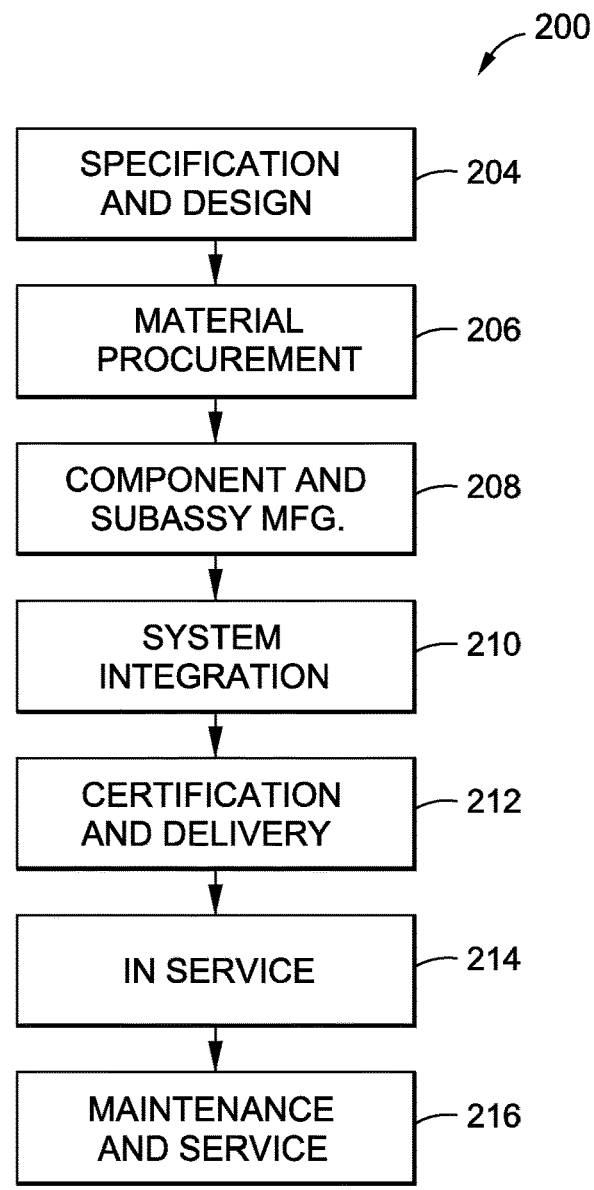
FIG. 2 is an illustration of a flow diagram of an aircraft production and service method.
Figure 3:
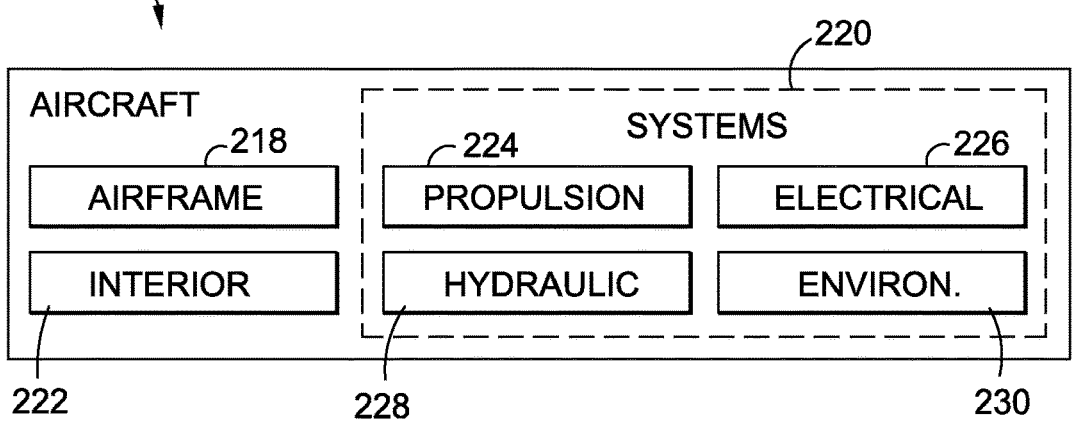
FIG. 3 is an illustration of a block diagram of an aircraft.

FIG. 2 is a flow diagram of an aircraft production and service method 200. FIG. 3 is a block diagram of an aircraft 202. Referring to FIGS. 2-3, embodiments of the disclosure may be described in the context of the aircraft manufacturing and service method 200 as shown in FIG. 2 and the aircraft 202 as shown in FIG. 3. During pre-production, exemplary method 200 may include specification and design 204 of the aircraft 202 and material procurement 206. During production, component and subassembly manufacturing 208 and system integration 210 of the aircraft 202 takes place. Thereafter, the aircraft 202 may go through certification and delivery 212 in order to be placed in service 214. While in service by a customer, the aircraft 202 is scheduled for routine maintenance and service 216 (which may also include modification, reconfiguration, refurbishment, and other suitable services).

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and other suitable operators.

As shown in FIG. 3, the aircraft 202 produced by exemplary method 200 may include an airframe 218 with a plurality of systems 220 and an interior 222. Examples of high-level systems 220 include one or more of a propulsion system 224, an electrical system 226, a hydraulic system 228, and an environmental system 230. Any number of other systems may be included. Although an aerospace example is shown, the principles of the invention may be applied to other industries, such as the automotive industry.

Methods and systems embodied herein may be employed during any one or more of the stages of the production and service method 200. For example, components or subassemblies corresponding to component and subassembly manufacturing 208 may be fabricated or manufactured in a manner similar to components or subassemblies produced while the aircraft 202 is in service. Also, one or more apparatus embodiments, method embodiments, or a combination thereof, may be utilized during component and subassembly manufacturing 208 and system integration 210, for example, by substantially expediting assembly of or reducing the cost of the aircraft 202. Similarly, one or more of apparatus embodiments, method embodiments, or a combination thereof, may be utilized while the aircraft 202 is in service, for example and without limitation, to maintenance and service 216.

Figure 4A:
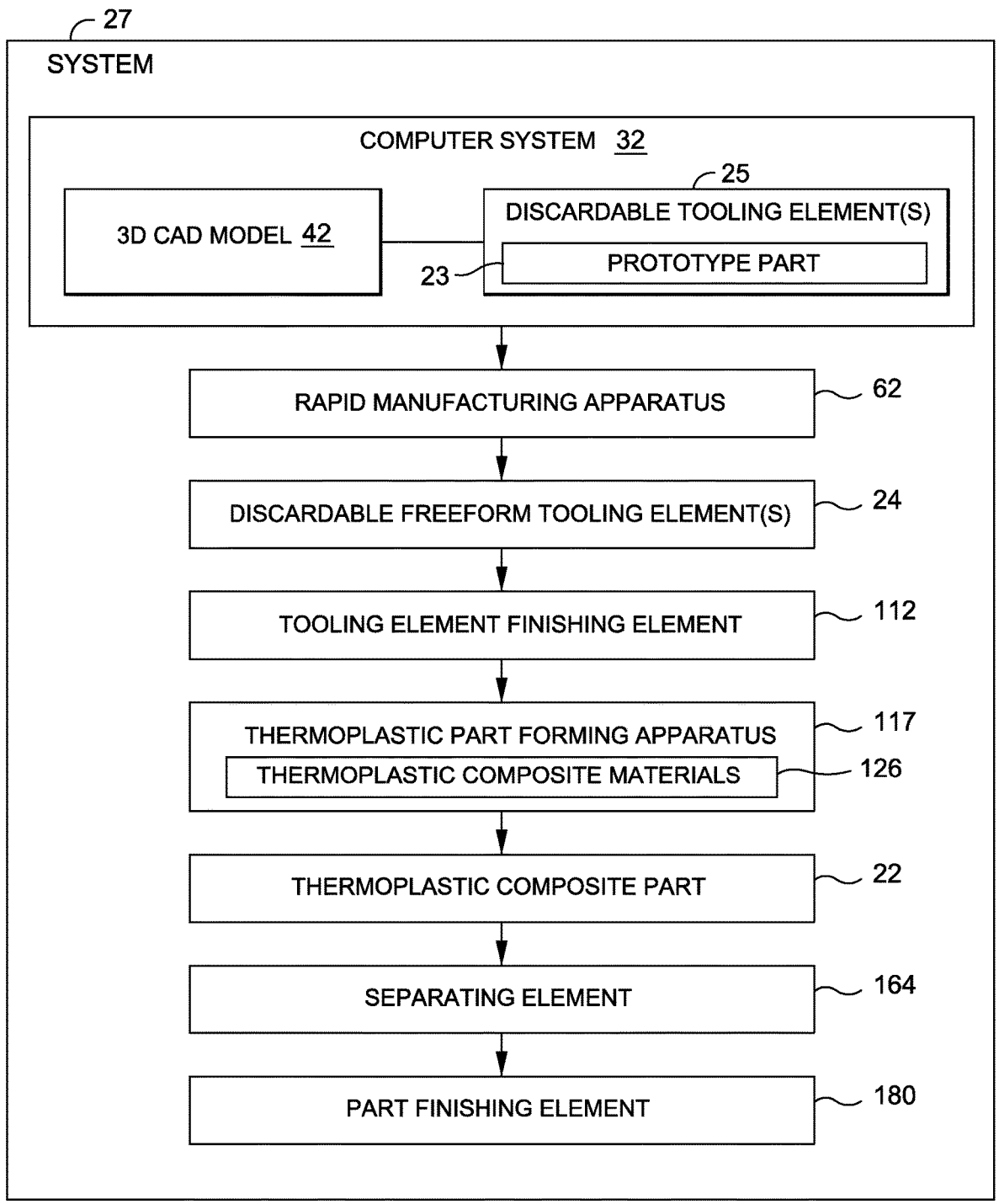
FIG. 4A is an illustration of a block diagram of one of the disclosed embodiments of a system for prototyping thermoplastic composite parts.
Figure 20:
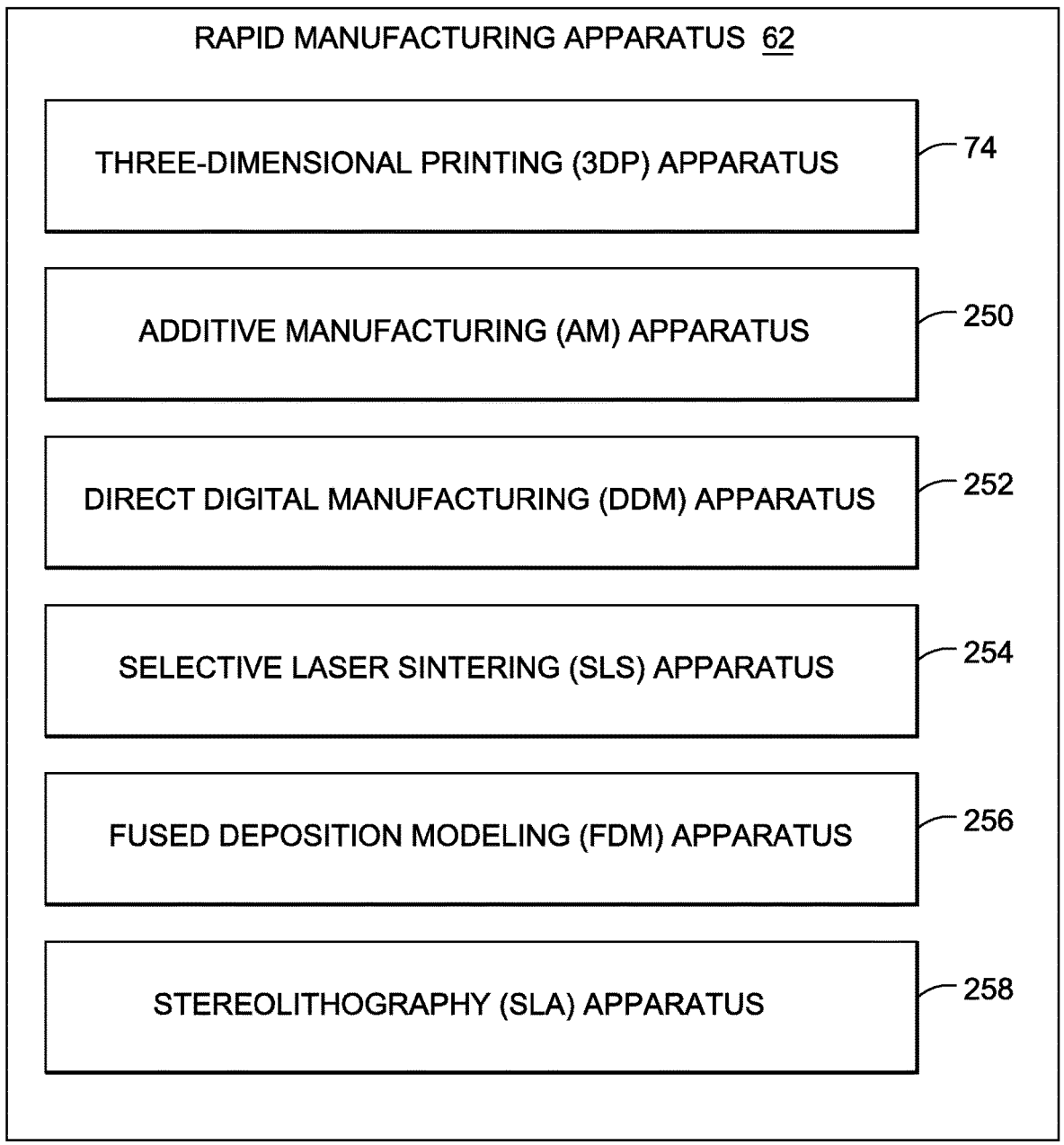
FIG. 20 is an illustration of a block diagram of exemplary embodiments of rapid manufacturing apparatuses; and, FIG. 21 is an illustration of a block diagram of exemplary embodiments of tooling element finishing processes and tooling element finishing elements that may be used in embodiments of the disclosed methods and systems.

FIG. 4A is an illustration of a block diagram of one of the disclosed embodiments of a system 27 for prototyping thermoplastic composite parts 22 using discardable freeform tooling elements 24. The system 27 comprises a computer system 32 for generating a three-dimensional computer-aided design (3D CAD) model 42 of one or more discardable tooling elements 25 for a prototype part 23. The system 27 further comprises a rapid manufacturing apparatus 62 for fabricating one or more discardable freeform tooling elements 24 based on the 3D CAD model 42. The rapid manufacturing apparatus 62 may comprise a three-dimensional printing (3DP) apparatus 74 (see FIG. 7) or another suitable rapid manufacturing apparatus 62. Preferably, the rapid manufacturing apparatus 62 comprises a three-dimensional printing (3DP) apparatus 74 (see FIG. 7). However, as shown in FIG. 20, which is an illustration of a block diagram of exemplary embodiments of rapid manufacturing apparatuses, the rapid manufacturing apparatus 62 may also comprise an additive manufacturing (AM) apparatus 250, a direct digital manufacturing (DDM) apparatus 252, a selective laser sintering (SLS) apparatus 254, a fused deposition modeling (FDM) apparatus 256, and a stereolithography (SLA) apparatus 258, or another suitable rapid manufacturing apparatus.

The system 27 further comprises a thermoplastic part forming apparatus 117 for forming thermoplastic composite materials 126 into a thermoplastic composite part 22 using the one or more discardable freeform tooling elements 24. Preferably, the thermoplastic part forming apparatus 117 comprises, as discussed in further detail below, a thermoplastic stamp forming apparatus 134 (see FIG. 9) or a thermoforming apparatus 194 (see FIG. 16). Preferably, the thermoplastic composite materials 126 and thermoplastic composite part 22 are fiber-reinforced. The system 27 further comprises a separating element 164, discussed in further detail below, for separating the thermoplastic composite part 22 from the one or more discardable freeform tooling elements 24. The system 27 may further comprise a part finishing element 180, discussed in further detail below, for finishing one or more surfaces of the thermoplastic composite part 22 to obtain desired surface characteristics. The system 27 may further comprise a tooling element finishing element 112, discussed in further detail below, for finishing one or more surfaces of the one or more discardable freeform tooling elements 24 to obtain desired surface characteristics. Preferably, the system 27 reduces inventory 28 (see FIG. 4B) and inventory storage space 30 (see FIG. 4B) for the one or more discardable freeform tooling elements 24.

Figure 4B:
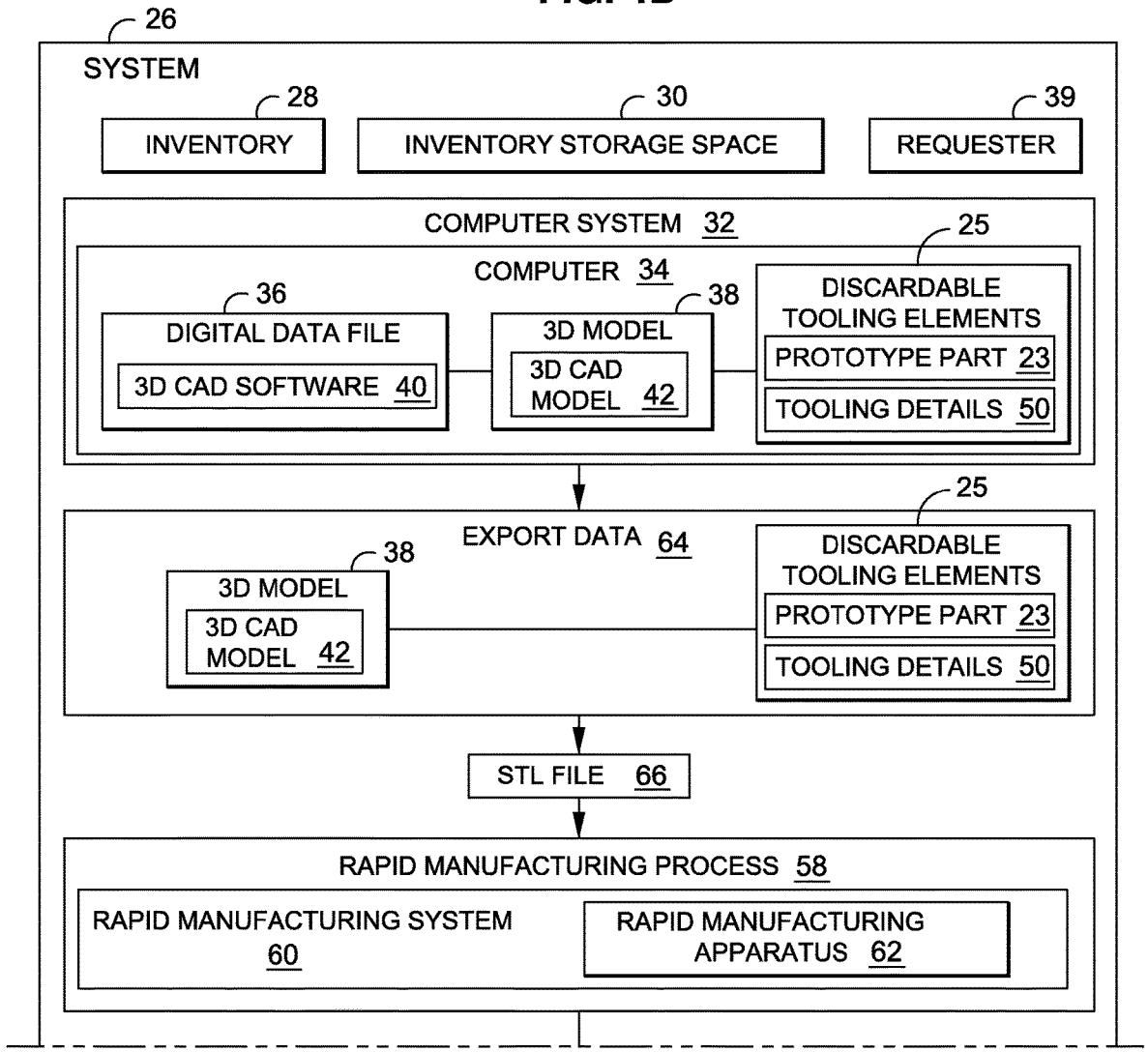
FIGS. 4B-4C are illustrations of a block diagram of another one of the disclosed embodiments of a system using discardable freeform tooling elements.
Figure 4C:
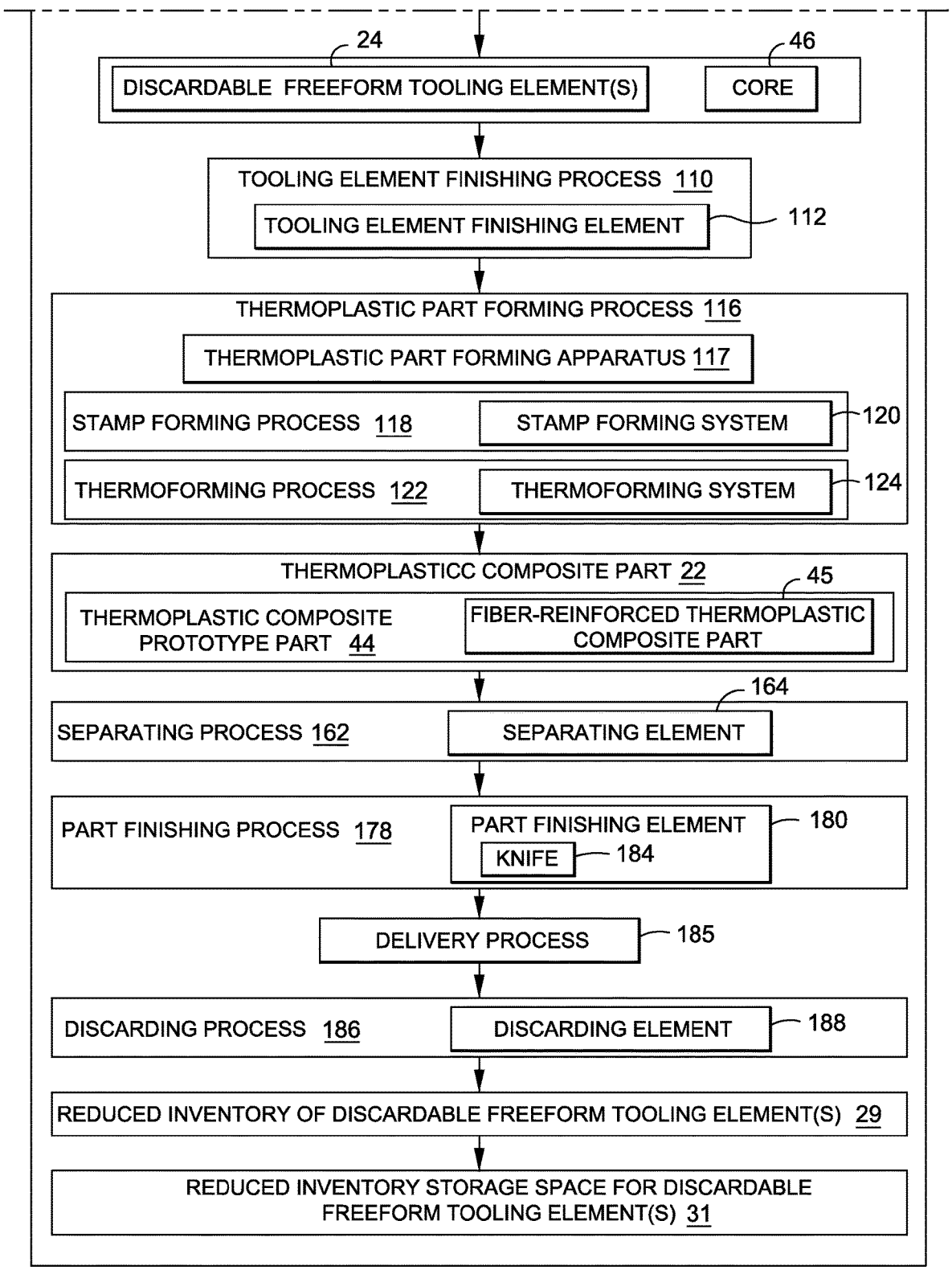
Figure 5:
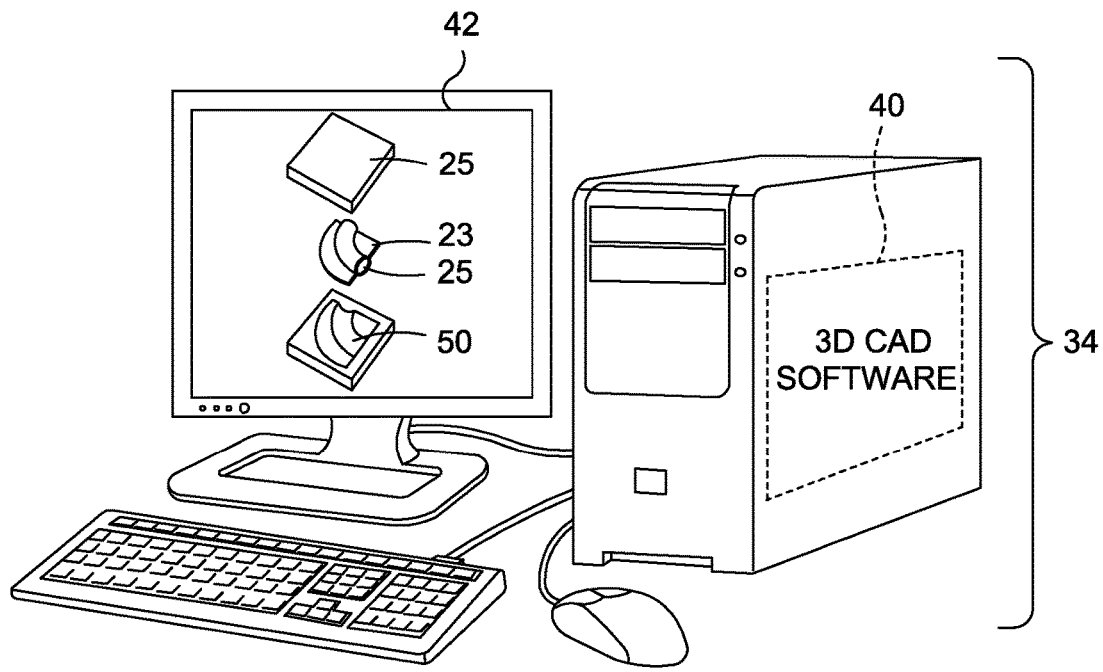
FIG. 5 is an illustration of a perspective view of an exemplary embodiment of a computer having a 3D CAD model of one or more discardable tooling elements for a prototype part that may be used in embodiments of the disclosed methods and systems.
Figure 8:
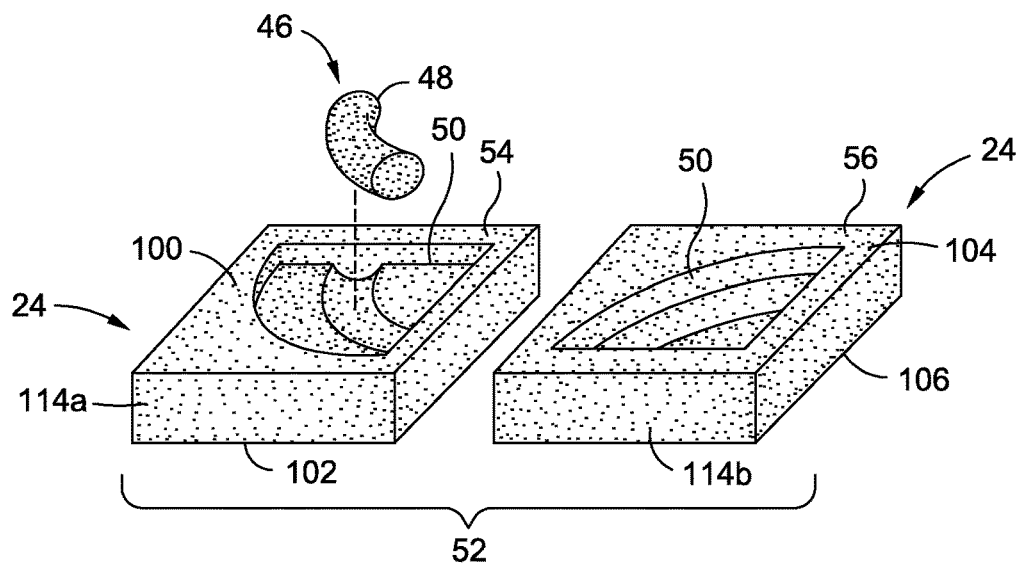
FIG. 8 is an illustration of exemplary discardable freeform tooling elements formed from one of the embodiments of a rapid manufacturing process that may be used in embodiments of the disclosed methods and systems.

FIGS. 4B-4C are illustrations of a block diagram of another one of the disclosed embodiments of a system 26 using discardable freeform tooling elements 24 in the manufacture of thermoplastic composite parts 22 to reduce inventory 28 of the one or more discardable freeform tooling elements 24 and to reduce inventory storage space 30 for the one or more discardable freeform tooling elements 24. The thermoplastic composite part 22 is preferably a thermoplastic composite prototype part 44 (see FIG. 15) and preferably has a complex geometry. Preferably, the thermoplastic composite part 22 is a fiber-reinforced thermoplastic composite part 45 (see FIG. 15). As shown in FIG. 4B and FIG. 5, the system 26 comprises a computer system 32 having a computer 34 with a digital data file 36 comprising a three-dimensional model 38 of one or more discardable tooling elements 25 for a prototype part 23. Preferably, the digital data file 36 comprises three-dimensional computer-aided design (3D CAD) software 40 for generating a 3D CAD model 42 of the one or more discardable tooling elements 25 for the prototype part 23. The desired prototype part 23 and tooling details 50 (see FIG. 5) of the one or more discardable tooling elements 25 are preferably defined using the 3D CAD software 40. Tooling details 50 may include such information as dimensions, materials, tolerances, shapes, or other suitable information regarding the discardable tooling elements 25. FIG. 5 is an illustration of a perspective view of an exemplary embodiment of a computer 34 having the 3D CAD model 42 of the one or more discardable tooling elements 25 and tooling details 50 for the prototype part 23. As shown in FIG. 8, the discardable freeform tooling elements 24 can define a core 46. FIG. 8 shows an exemplary embodiment of the core 46 in the form of a tube 48. The core 46 may be removed or dissolved once the thermoplastic composite part 22 (see FIG. 15) is formed or the core 46 may not need to be removed and may be left in the thermoplastic composite part 22 that is formed. Alternatively, the thermoplastic composite part 22 may not have internal geometry and thus no core 46 would be formed. As shown in FIG. 8, the one or more discardable freeform tooling elements 24 may preferably comprise a mold 52 having a first portion 54 and a second portion 56.

As shown in FIG. 4B, the system 26 further comprises export data 64 from the computer system 32. The export data 64 preferably comprises the 3D model 38, preferably in the form of the 3D CAD model 42, having the one or more discardable tooling elements 25 and tooling details 50 for the prototype part 23. Preferably, the export data 64 may be easily converted into a file format such as an STL (stereolithography) file 66. As shown in FIG. 4B, the system 26 further comprises a rapid manufacturing process 58 using a rapid manufacturing system 60 with a rapid manufacturing apparatus 62. The rapid manufacturing process 58 receives the STL file 66 converted from the export data 64 in order to manufacture and form one or more discardable freeform tooling elements 24 (see FIG. 8) for a thermoplastic composite part 22 (see FIG. 15). The rapid manufacturing process 58 and rapid manufacturing system 60 use the rapid manufacturing apparatus 62 to form the one or more discardable freeform tooling elements 24 for the thermoplastic composite part 22. The export data 64 directs automated manufacturing of the one or more discardable freeform tooling elements 24 for the thermoplastic composite part 22 in which additive layers 94 (see FIG. 7) of build material 80 (see FIG. 7) are successively formed, one on top of the next, until the features of the one or more discardable freeform tooling elements 24 for the thermoplastic composite part 22 match those of the 3D CAD model 42 of the one or more discardable tooling elements 25 for the prototype part 23. The rapid manufacturing process 58 which performs the additive layering may comprise known processes such as additive manufacturing (AM), direct digital manufacturing (DDM), three-dimensional printing (3DP), selective laser sintering (SLS), fused deposition modeling (FDM), stereolithography (SLA) or another suitable process. Rapid manufacturing processes are typically used when needed production quantities are low and in instances where part complexity beyond high volume processes may be required. Preferably, the rapid manufacturing process 58 comprises a 3DP process 70 (see FIG. 6). Other processes for direct digital manufacturing of discardable freeform tooling elements 24 may comprise selective laser sintering of metal powders or direct digital manufacturing involving sintering or extrusion of thermoplastic materials. The rapid manufacturing apparatus 62 may comprise a three-dimensional printing (3DP) apparatus 74 (see FIG. 7) or another suitable rapid manufacturing apparatus 62. Preferably, the rapid manufacturing apparatus 62 comprises the 3DP apparatus 74 (see FIG. 7). However, as shown in FIG. 20, the rapid manufacturing apparatus 62 may also comprise an additive manufacturing (AM) apparatus 250, a direct digital manufacturing (DDM) apparatus 252, a selective laser sintering (SLS) apparatus 254, a fused deposition modeling (FDM) apparatus 256, and a stereolithography (SLA) apparatus 258, or another suitable rapid manufacturing apparatus.

Figure 6:
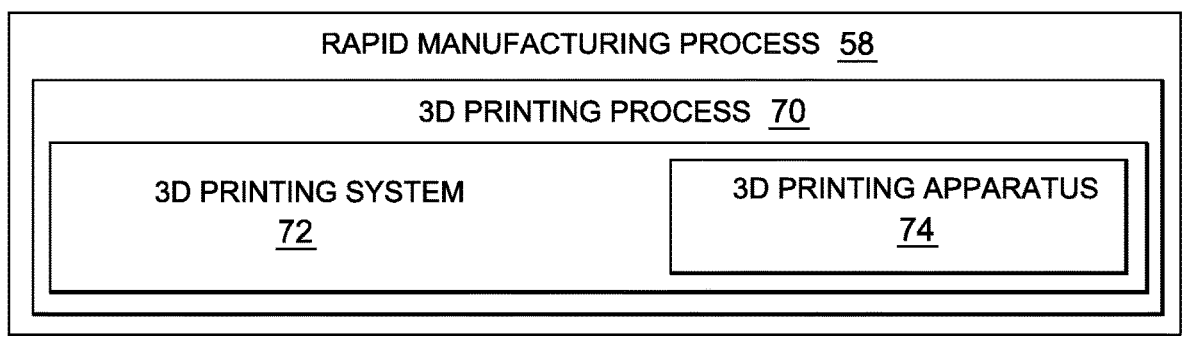
FIG. 6 is an illustration of a block diagram of an exemplary embodiment of a 3D printing process and system that may be used in embodiments of the disclosed methods and systems.
Figure 7:
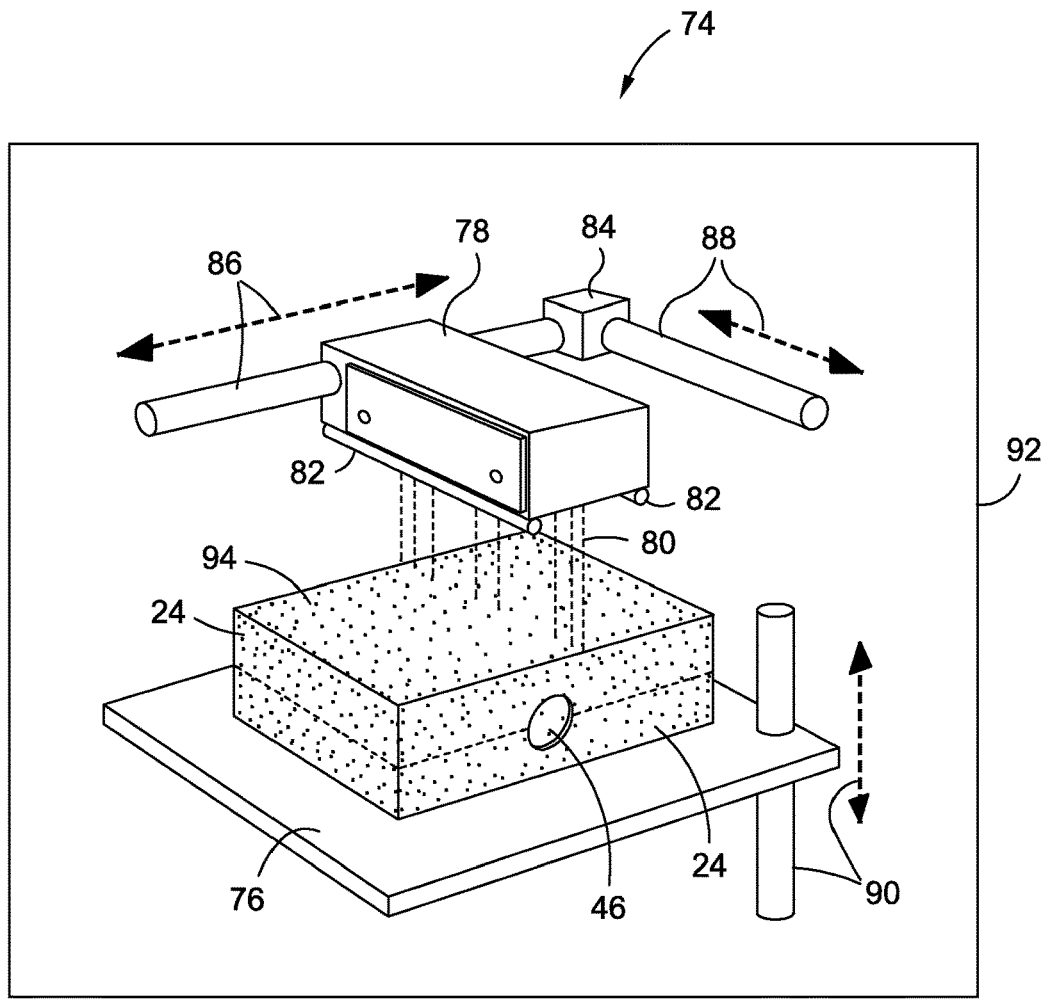
FIG. 7 is an illustration of a schematic diagram of a 3D printing apparatus that may be used in embodiments of the disclosed methods and systems.

FIG. 6 is an illustration of a block diagram of an exemplary embodiment of the 3DP process 70 comprising a three-dimensional printing (3DP) system 72 having the 3DP apparatus 74 that may be used in embodiments of the disclosed methods and systems. FIG. 7 is an illustration of a schematic diagram of the 3DP apparatus 74 that may be used in embodiments of the disclosed methods and systems. The 3DP apparatus 74 may comprise in an exemplary embodiment a build platform 76 and a printer head 78 for jetting a build material 80, such as a liquid photopolymer resin or another suitable liquid or powder build material, in order to deposit and form each layer 94 of the discardable freeform tooling elements 24 on the build platform 76. The 3DP apparatus 74 may further comprise an ultraviolet light 82 mounted on the printer head 78 to cure each layer 94 as it is deposited. The 3DP apparatus 74 may further comprise a raster build device 84 having an x-axis 86, a y-axis 88 and a z-axis 90, and a housing 92. During the 3DP process 70, the shape of the one or more discardable freeform tooling elements 24 for the thermoplastic composite part 22 is determined using the export data 64 (see FIG. 4B) from the computer system 32 (see FIG. 4B) of the 3D CAD model 42 (see FIG. 4B) of the one or more discardable tooling elements 25 (see FIG. 4B) for the prototype part 23 (see FIG. 4B). The 3DP process 70 allows for rapid production of actual 3D models for the one or more discardable tooling elements 25 in order to mold thermoplastic composite parts 22 (see FIG. 15) preferably fiber-reinforced thermoplastic composite parts 45 (see FIG. 15). For embodiments of the methods and systems disclosed herein, preferably, the 3DP process 70 uses ceramic powder with chemically active fluids for the build material 80 where the ceramic powder is solidified in the layers 94 via the deposition of the chemically active fluids. For embodiments of the methods and system disclosed herein, the 3DP apparatus 74 used may be obtained from Z Corporation of Burlington, Mass.

FIG. 8 is an illustration of exemplary embodiments of the discardable freeform tooling elements 24, in the form of mold 52, and the core 46, in the form of tube 48, formed from one of the disclosed embodiments of the rapid manufacturing processes 58 discussed above. As shown in FIG. 8, the discardable freeform tooling elements 24 may be in the form of mold 52 having first portion 54 and second portion 56. However, the discardable freeform tooling elements 24 may also comprise a single portion mold or tooling element, or another suitable mold or tooling element. As shown in FIG. 8, the first portion 54 has a first molded side 100 and a second unmolded side 102. The second portion 56 has a first molded side 104 and a second unmolded side 106. As shown in FIG. 8, the core 46 may be in the form of tube 48. However, the core 46 may be in the form of other suitable prototype parts used to form composite structures or parts. Tooling details 50 of the mold 52 and core 46, if present, are preferably designed and drafted with 3D CAD software 40 and the export data 64 of such tooling details 50 may be received by the rapid manufacturing apparatus 62 to form the mold 52 and core 46, if present. The discardable freeform tooling element 24 may be comprised of ceramics such as silica based aggregates, powdered aluminous silica with silicate and polymer binder, aluminum silicates, alumina, and other suitable ceramics; metals such as metal powders and other suitable metal materials; polymers such as polymer powders and other suitable polymer materials, or another suitable freeform tooling element material. Preferably, the discardable freeform tooling element 24 comprises a soluble ceramic material such as powdered aluminous silica with silicate and polymer binder. Preferably, the discardable freeform tooling element 24 comprises ceramic materials produced in the 3DP process 70, in which layers 94 of ceramic powder are spread and cross-sections of the desired discardable freeform tooling element 24, as defined by the 3D CAD model 42, are solidified via the deposition of chemically active fluids. Preferably, the ceramic materials may be soluble in water or other chemicals, may be insoluble, or may be both soluble and insoluble in combination. Preferably, the ceramic materials may be of high, low, or controlled porosity and thermal conductivity. Preferably, the soluble ceramic material allows for the creation of an interior three-dimensional volume 108 (see FIG. 15) within the formed and finished thermoplastic composite prototype part 44.

Figure 21:
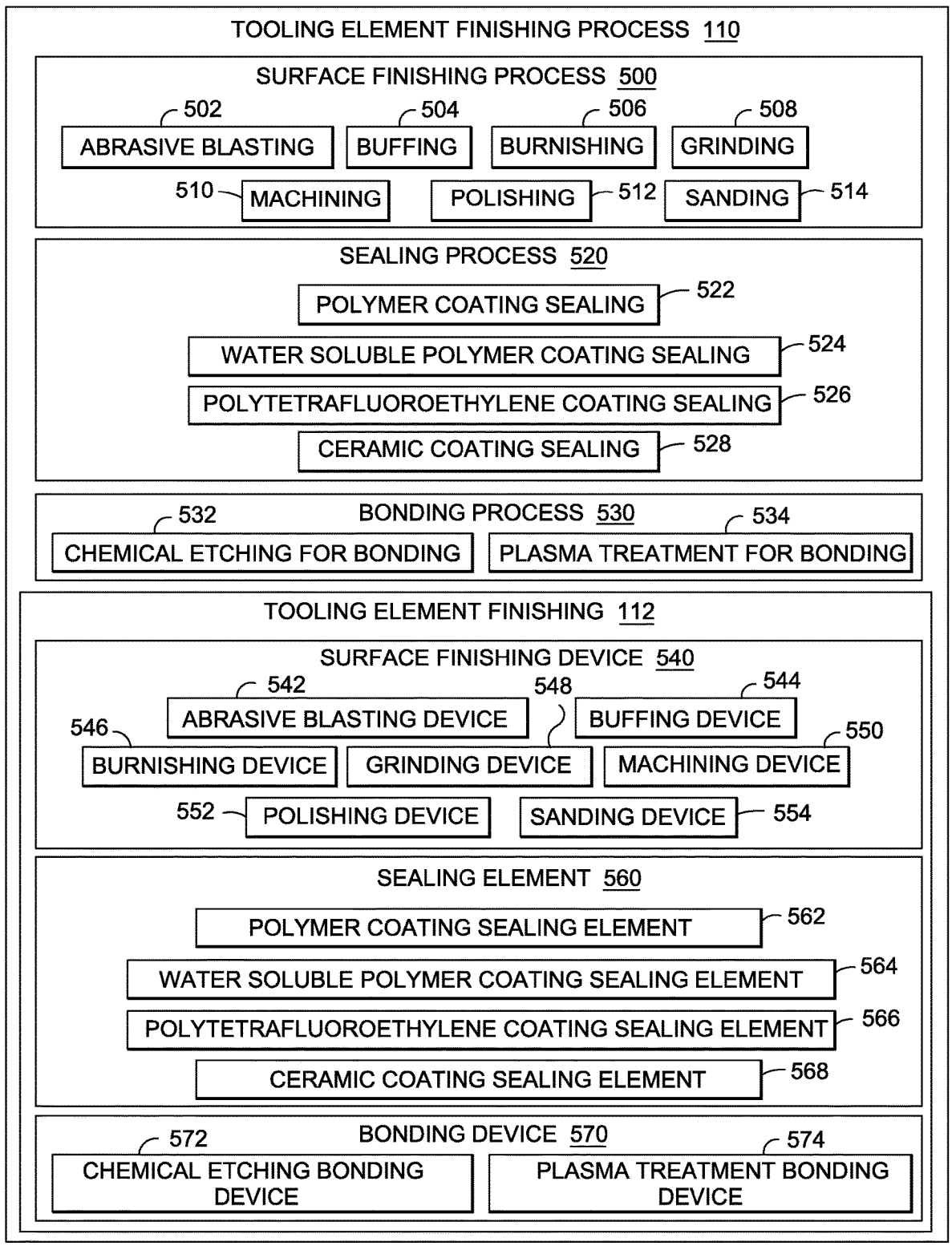

As shown in FIG. 4C, the system 26 may further comprise a tooling element finishing process 110 comprising a tooling element finishing element 112. For example, after the one or more discardable freeform tooling elements 24 are formed by one of the embodiments of the rapid manufacturing process 58, the one or more discardable freeform tooling elements 24 may be finished with a tooling element finishing process 110 in order to obtain desired surface characteristics of one or more surfaces 114a, 114b (see FIG. 8) of the one or more discardable freeform tooling elements 24. FIG. 21 is an illustration of a block diagram of exemplary embodiments of tooling element finishing processes 110 and tooling element finishing elements 112 that may be used in embodiments of the disclosed methods and systems. As shown in FIG. 21, the tooling element finishing process 110 may comprise one or more surface finishing processes 500 such as abrasive blasting 502, buffing 504, burnishing 506, grinding 508, machining 510, polishing 512, sanding 514, and other suitable surface finishing processes. As shown in FIG. 21, the tooling element finishing process 110 may also comprise one or more sealing processes 520 such as polymer coating sealing 522, water soluble polymer coating sealing 524, polytetrafluoroethylene coating sealing 526, ceramic coating sealing 528, and other suitable sealing processes. For example, sealing one or more surfaces 114a, 114b of the discardable freeform tooling element 24 formed by the rapid manufacturing process 58 can provide a smooth surface finish that can facilitate separation of the discardable freeform tooling element 24 from the thermoplastic composite part 22, preferably in the form of a thermoplastic composite prototype part 44 (see FIG. 15), that is finally formed by the disclosed methods and systems, as discussed in detail below. As shown in FIG. 21, the tooling element finishing process 110 may also comprise one or more bonding processes 530 such as chemical etching for bonding 532, plasma treatment for bonding 534, and other suitable processes for bonding. As shown in FIG. 21, the tooling element finishing element 112 may comprise one or more surface finishing devices 540 such as abrasive blasting devices 542, buffing devices 544, burnishing devices 546, grinding devices 548, machining devices 550, polishing devices 552, sanding devices 554, and other suitable surface finishing devices. As shown in FIG. 21, the tooling element finishing element 112 may also comprise one or more sealing elements 560 such as polymer coating sealing elements 562, water soluble polymer coating sealing elements 564, polytetrafluoroethylene coating sealing elements 566, ceramic coating sealing elements 568, and other suitable sealing elements. As shown in FIG. 21, the tooling element finishing element 112 may also comprise one or more bonding devices 570 such as chemical etching bonding devices 572, plasma treatment bonding devices 574, and other suitable bonding devices. As a layer-based, additive process, rapid manufacturing processes may produce visible evidence of material deposition, and in some cases, visible tool paths. Without finishing processes, one or more surfaces 114a, 114b of the discardable freeform tooling elements 24 may not be smooth. However, a textured surface may be preferred for some applications, such as when the component is not visible or when smoothness does not impact performance. The amount of surface finishing, sealing, and/or bonding may vary according to the need or desire to have a very smooth surface finish or a less smooth surface finish of the one or more discardable freeform tooling elements 24.

Figure 15:
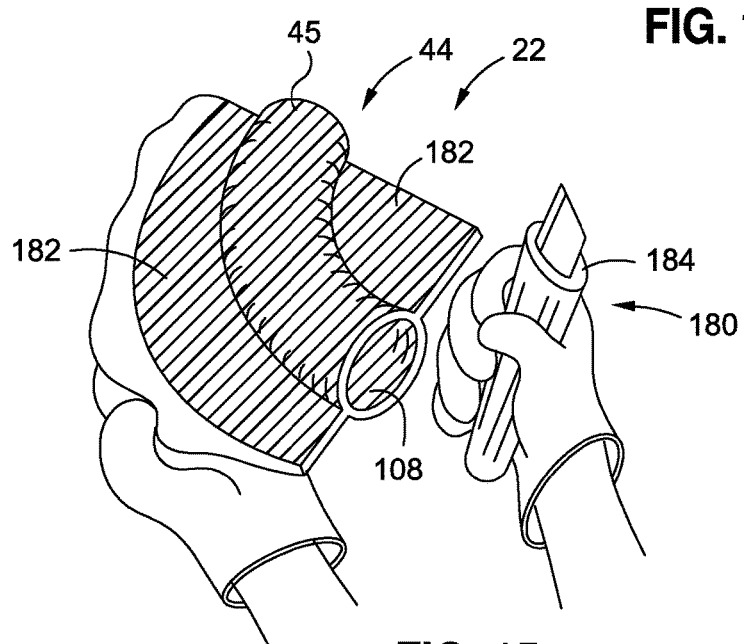
FIG. 15 is an illustration of an embodiment of a part finishing element that may be used in embodiments of the disclosed methods and systems.

Once the one or more discardable freeform tooling elements 24 are formed by the rapid manufacturing process 58, and if necessary, surface finished, they are used in a thermoplastic part forming process 116 to manufacture the thermoplastic composite part 22 (see FIG. 15), preferably in the form of a thermoplastic composite prototype part 44 (see FIG. 15). As shown in FIG. 4C, the thermoplastic part forming process 116 of system 26 may comprise, in one embodiment, a thermoplastic stamp forming process 118 using a thermoplastic stamp forming system 120 (see FIG. 9). In another embodiment, the thermoplastic part forming process 116 may comprise a thermoforming process 122 using a thermoforming system 124 (see FIG. 16). However, the thermoplastic part forming process 116 may also comprise other suitable composite forming processes.

Figure 9:
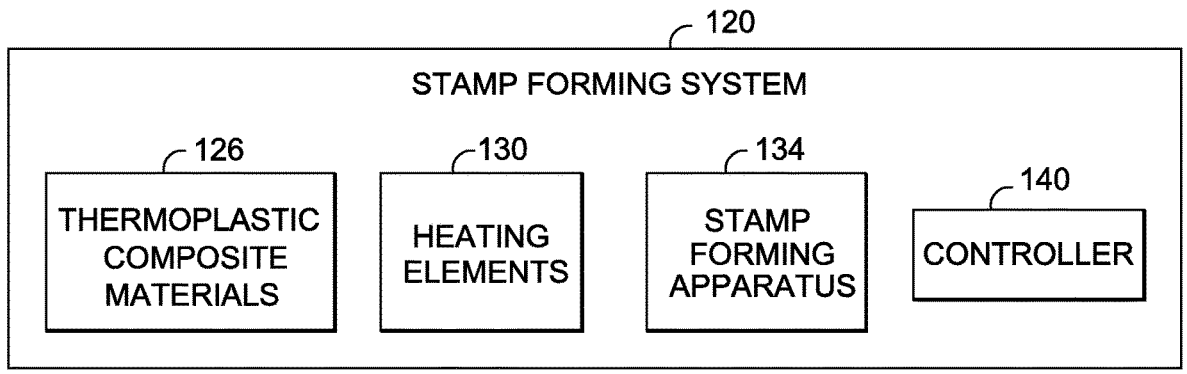
FIG. 9 is an illustration of a block diagram of an exemplary embodiment of a stamp forming system that may be used in embodiments of the disclosed methods and systems.

FIG. 9 is an illustration of a block diagram of an exemplary embodiment of the thermoplastic stamp forming system 120 that may be used in embodiments of the disclosed methods and system. The thermoplastic stamp forming system 120 comprises one or more thermoplastic composite materials 126. Preferably, the thermoplastic composite materials 126 are in the form of a fiber-reinforced thermoplastic composite material 128 such as prepreg sheets (see FIG. 11). The thermoplastic composite material 126 may comprise polymer matrix composite materials that may include, but are not limited to, the following thermoplastic resins: polyphenylene sulfide (PPS), polyetherimide (PEI), polyether ketone ketone (PEKK), polyether ether ketone (PEEK), or other suitable thermoplastic resins. This can include reinforced thermoplastic laminates, unidirectional tapes, pre-impregnated fabrics that use either carbon or glass as the primary reinforcement, fiber reinforced plastic, dry carbon fibers, pre-impregnated carbon fiber fabrics, thermoset resins, fiberglass, poly paraphenylene terephthalamide, light, strong para-aramid synthetic fibers, or another suitable polymer matrix composite material. In particular, glass fiber (GF) reinforced polyetherimide (PEI) woven fabric made of sheath surrounded, polymer powder impregnated fiber bundles manufactured by Enichem of Italy, may be used. Preferably, the thermoplastic composite material 126 is fire resistant. The thermoplastic stamp forming system 120 further comprises a heating element 130 such as an infrared (IR) oven 132 (see FIG. 11) or another suitable heating element, to heat the thermoplastic composite materials 126. The thermoplastic stamp forming system 120 further comprises a stamp forming apparatus 134 having a first stamping plate 136 and a second stamping plate 138 (see FIG. 10) for applying pressure to and pressing the one or more thermoplastic composite materials 126 and the one or more discardable freeform tooling elements 24 together. The thermoplastic stamp forming system 120 further comprises a controller 140 for controlling the components of the stamp forming system 120.

Figure 10:
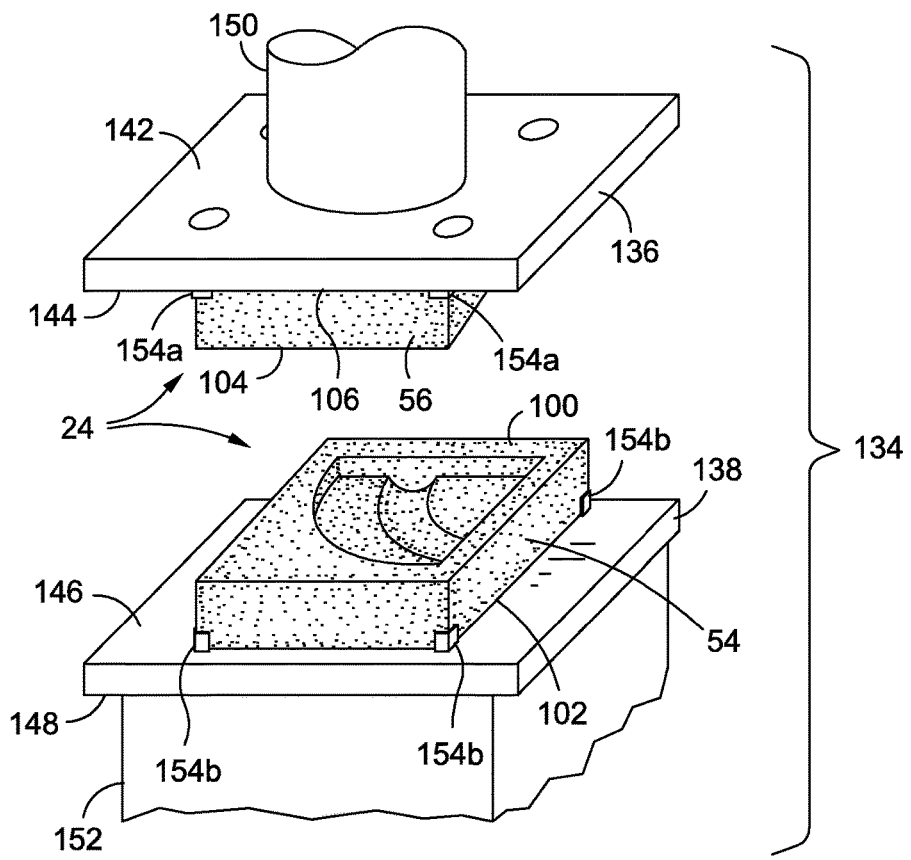
FIG. 10 is an illustration of the discardable freeform tooling elements attached to an exemplary embodiment of a stamp forming apparatus that may be used in embodiments of the disclosed methods and systems.

FIG. 10 is an illustration of the discardable freeform tooling elements 24, in the form of first portion 54 and second portion 56, attached to an exemplary embodiment of the stamp forming apparatus 134 that may be used in embodiments of the disclosed methods and system. The stamp forming apparatus 134 comprises the first stamping plate 136 and the second stamping plate 138. The first stamping plate 136 has a top side 142 and a bottom side 144. The second stamping plate 138 has a top side 146 and a bottom side 148. The top side 142 of the first stamping plate 136 is attached to an upper portion 150 of the stamp forming apparatus 134. The bottom side 148 of the second stamping plate 138 is attached to a base portion 152 of the stamp forming apparatus 134. The second unmolded side 106 of the second portion 56 is attached to the bottom side 144 of the first stamping plate 136 via attachment elements 154a. The second unmolded side 102 of the first portion 54 is attached to the top side 146 of the second stamping plate 138 via attachment elements 154b. The attachment elements 154a, 154b may be in the form of clamps, pins, stops, or other suitable attachment elements.

FIG. 11 is an illustration of the thermoplastic composite materials 126, in the form of the fiber-reinforced thermoplastic composite material 128, such as a prepreg sheet, being heated in the heating element 130, in the form of infrared (IR) oven 132. The thermoplastic composite material 126 is heated for a sufficient period of time until it is sufficiently pliable to form around the contours of the mold 52 for the thermoplastic composite part 22. The time period for heating is dependent on the type of material comprising the thermoplastic composite material 126. Pre-consolidated laminates may be heated by contact heating in an external heater up to about 120° C. above the glass transition temperature ($T_g$) of the polymer matrix.

FIG. 12 is an illustration of an exploded view of a stamp form part assembly 156 prior to being stamp formed in the thermoplastic stamp forming apparatus 134. The stamp form part assembly 156 may comprise in an exemplary embodiment one or more thermoplastic composite materials 126, preferably in the form of fiber-reinforced thermoplastic composite materials in the form of prepreg sheets 128a, 128b, being positioned relative to the first portion 54, the second portion 56, and the core 46. As shown in FIG. 12, a first prepreg sheet 128a is positioned in between the first molded side 100 of the first portion 54 and a bottom portion 158 of the core 46 that corresponds to the first molded side 100 of the first portion 54, and a second prepreg sheet 128b is positioned in between the first molded side 104 of the second portion 56 and a top portion 160 of the core 46 that corresponds to the first molded side 104 of the second portion 56.

FIG. 13 is an illustration of the stamp form part assembly 156, including the first portion 54, the first and second prepreg sheets 128a, 128b, the core 46, and the second portion 56 being stamp formed and pressed together in the stamp forming apparatus 134 that may be used in embodiments of the disclosed methods and systems. The stamp form part assembly 156 is pressed for a sufficient period of time at a sufficient pressure to form the thermoplastic composite part 22 preferably in the form of the thermoplastic composite prototype part 44. Alternately, the stamp form part assembly 156 may comprise the one or more discardable freeform tooling elements 24 and one or more thermoplastic composite materials 126 without the core 46. Preferably, the pressure applied by the thermoplastic stamp forming apparatus 134 to the stamp form part assembly 156 is in a range of from about 100 psi (pounds per square inch) to about 900 psi, and is dependent on the type of material comprising the one or more discardable freeform tooling elements 24 and the type of material comprising the thermoplastic composite materials 126. The time period during which the stamp form part assembly 156 is pressed together is also dependent on the type of material comprising the one or more discardable freeform tooling elements 24 and the type of material comprising the thermoplastic composite materials 126. The typical time period for pressing the stamp form part assembly 156 together may be in a range of from about 30 seconds to about two minutes. Pre-consolidated laminates may be stamp formed in matched or mix-matched tools, such as matched metallic tools, mix-matched metallic tools, or mix-matched metallic and non-metallic tools. Typical cycle times, including preheating time of the pre-consolidated laminates, may be in the range of three (3) minutes. Useful processing conditions, such as stamping temperature, stamping velocity and hold-down pressure required for stamp forming of such composite may be determined based on the materials used.

Figure 14:
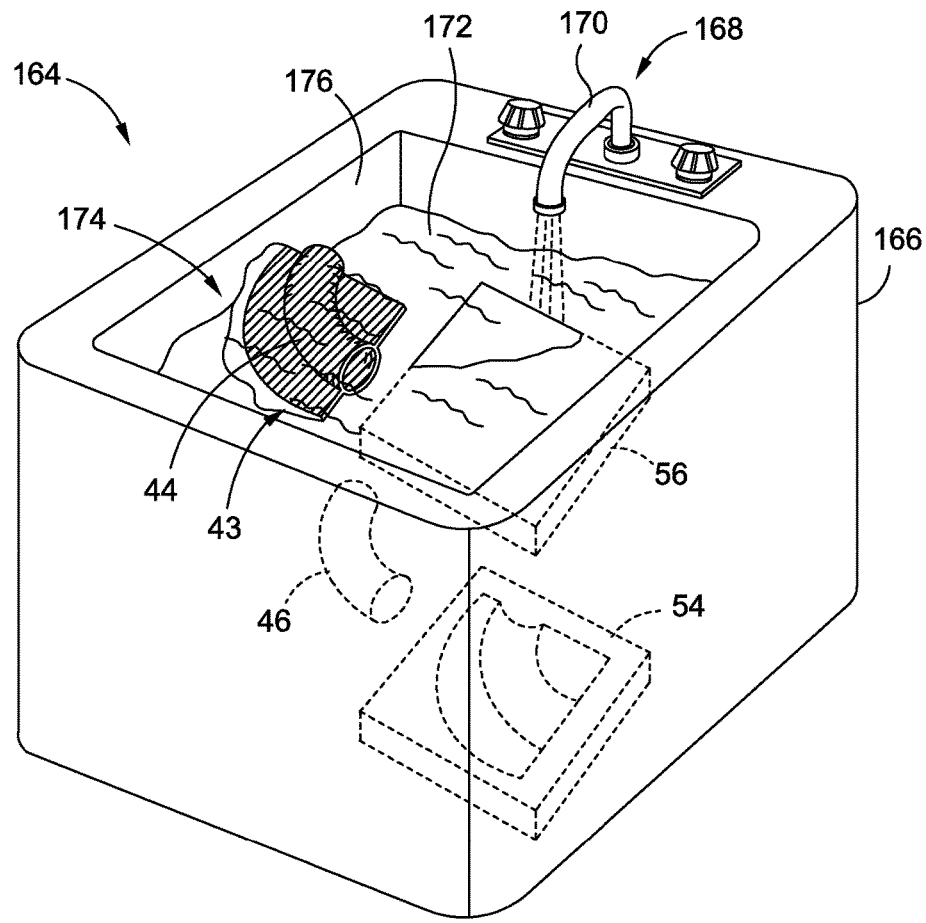
FIG. 14 is an illustration of an embodiment of a separating element that may be used in embodiments of the disclosed methods and systems.

As shown in FIGS. 4B and 14, the system 26 further comprises a separating process 162 having a separating element 164 for separating the thermoplastic composite part 22, preferably in the form of the thermoplastic composite prototype part 44, from the discardable freeform tooling elements 24, in the form of first portion 54 and second portion 56, and from the core 46. FIG. 14 is an illustration of an embodiment of a separating element 164 for separating the thermoplastic composite part 22 from the discardable freeform tooling elements 24, in the form of first portion 54 and second portion 56, and from the core 46. FIG. 14 shows the separating element 164 being in the form of a water soluble system 166 comprising a water source 168, such as a water faucet 170 for dispensing water 172, and further comprising a water container 174, such as a sink 176, for holding the water 172 and the thermoplastic composite part 22, the discardable freeform tooling elements 24, in the form of first portion 54 and second portion 56, and the core 46. The separating element 164 may also comprise a chemical process (not shown) using chemicals, a mechanical process using mechanical devices (not shown) to separate the thermoplastic composite part 22 from the formed discardable freeform tooling elements 24, or another suitable separating element (not shown).

As shown in FIGS. 4C and 15, the system 26 may further comprise a part finishing process 178 having a part finishing element 180 for finishing one or more surfaces 182 (see FIG. 15) of the thermoplastic composite part 22, preferably in the form of the thermoplastic composite prototype part 44, to obtain desired surface characteristics. FIG. 15 is an illustration of an embodiment of the part finishing element 180, in the form of a knife 184, to finish surfaces 182 of the thermoplastic composite prototype part 44 to obtain desired surface characteristics. The part finishing process 178 may comprise known surface finishing processes such as abrasive blasting, sanding, machining, grinding, polishing, buffing, burnishing, and other suitable surface finishing processes. The part finishing process 178 may also comprise known sealing processes such as sealing with a polymer coating or water soluble polymer coating, sealing with a polytetrafluoroethylene coating, sealing with a ceramic coating, and other suitable sealing processes. The part finishing process 178 may also comprise other processes such as chemical etching for bonding, plasma treatment for subsequent bonding, and other suitable processes for bonding. The part finishing element 180 may comprise knife 182, as well as other known surface finishing devices such as sanding machines (not shown), polishing machines (not shown) and other suitable surface finishing devices, sealing elements such as polymer coatings, polytetrafluoroethylene coatings, ceramic coatings, and other suitable sealing elements, and other suitable part finishing elements and devices.

As shown in FIG. 4C, the system 26 may further comprise a discarding process 186 having a discarding element 188 for discarding the one or more discardable freeform tooling elements 24, as well as any core 46, if present. The discarding process 186 can result in reduced inventory 29 of discardable freeform tooling elements 24, as well as any cores 46, if present, and this can result in reduced inventory storage space 31 for discardable freeform tooling elements 24, as well as any cores 46, if present The discarding element 188 may comprise a waste disposal apparatus (not shown) such as a waste container (not shown), a waste compactor (not shown), or other suitable waste device or system.

Figure 16:
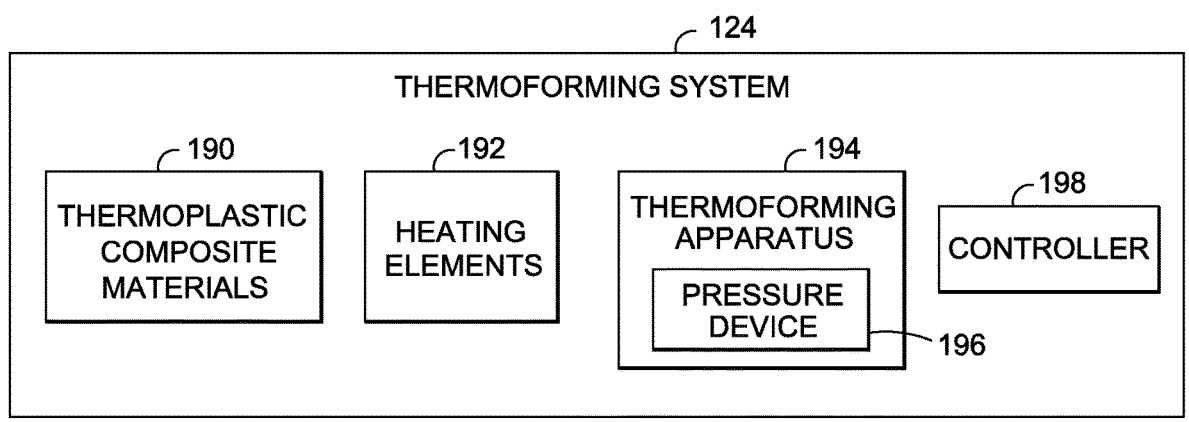
FIG. 16 is an illustration of a block diagram of an exemplary embodiment of a thermoforming system that may be used in embodiments of the disclosed methods and systems.

The thermoplastic composite part 22, preferably in the form of the thermoplastic composite prototype part 44, and more preferably in the form of a fiber-reinforced thermoplastic composite prototype part 45, may also be manufactured via a thermoforming system 124 (see FIG. 16). FIG. 16 is an illustration of a block diagram of a disclosed embodiment of the thermoforming system 124. The thermoforming system 124 may comprise one or more thermoplastic composite materials 190, preferably fiber-reinforced thermoplastic composite material 128 such as prepreg sheets 128a, 128b (see FIG. 12), or another suitable thermoplastic composite material. The thermoforming system 124 may further comprise a heating element 192, such as an infrared (IR) oven 132 (see FIG. 11) or another suitable heating element, to heat the thermoplastic composite materials 190. The thermoforming system 124 may further comprise a thermoforming apparatus 194 having a pressure device 196. The pressure device 196 may be in the form of a vacuum device (not shown), an air pressure device (not shown), an autoclave (not shown), or other suitable pressure device. The thermoforming system 124 may further comprise a controller 198 for controlling the components of the thermoforming system 124. In this embodiment, the one or more discardable freeform tooling elements 24 may be co-consolidated with one or more thermoplastic composite materials 190.

The thermoplastic composite part 22, preferably in the form of a thermoplastic composite prototype part 44, is preferably used as a thermoplastic composite part 22 in the manufacture of thermoplastic composite structures 20 used in aircraft 10. However, the thermoplastic composite part 22, preferably in the form of a thermoplastic composite prototype part 44, may also be used in the manufacture of composite structures used in other articles comprising spacecraft, rotorcraft, watercraft, automobiles, trucks, sporting goods, windmills, tubing and ducting used in petrochemical systems, medical devices, or other suitable articles.

Figure 17:
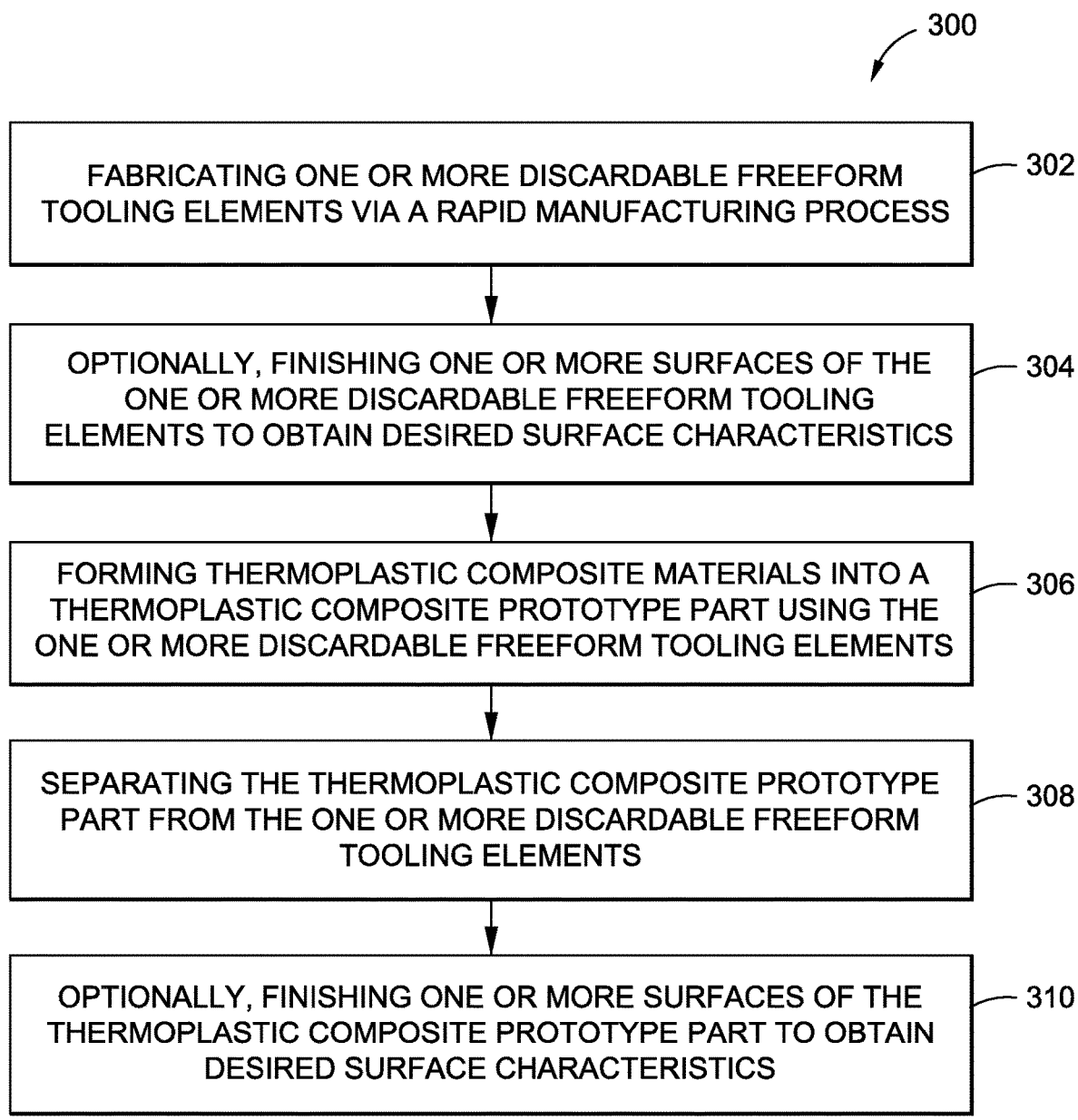
FIG. 17 is an illustration of a flow diagram of one of the embodiments of a method of the disclosure.

FIG. 17 is an illustration of a flow diagram of one of the embodiments of a method 300 of the disclosure for prototyping a thermoplastic composite part 22 (see FIG. 15). The method 300 comprises step 302 of fabricating one or more discardable freeform tooling elements 24 via a rapid manufacturing process 58 (see FIG. 4B). The rapid manufacturing process 58 may comprise additive manufacturing (AM), direct digital manufacturing (DDM), three-dimensional printing (3DP), selective laser sintering (SLS), fused deposition modeling (FDM), stereolithography (SLA) or another suitable process. Fabricating the one or more discardable freeform tooling elements 24 via the rapid manufacturing process 58 is preferably based on a digital data file 36 that represents a three-dimensional model 38 of the one or more discardable freeform tooling elements 24. The one or more discardable freeform tooling elements 24 allows for the creation of an interior three-dimensional volume 108 (see FIG. 15) within the thermoplastic composite part 22.

The discardable freeform tooling element 24 may be comprised of ceramics such as silica based aggregates, powdered aluminous silica with silicate and polymer binder, aluminum silicates, alumina, and other suitable ceramics; metals such as metal powders or other suitable metals; polymers such as polymer powders or other suitable polymers, or another suitable material. Preferably, the discardable freeform tooling element 24 comprises a soluble ceramic material such as powdered aluminous silica with silicate and polymer binder. Preferably, the soluble ceramic material allows for the creation of an interior three-dimensional volume 108 within the prototype part 22.

The method 300 may further comprise optional step 304 of finishing one or more surfaces 114a, 114b (see FIG. 8) of the one or more discardable freeform tooling elements 24 to obtain desired surface characteristics. The method 300 may further comprises step 306 of forming thermoplastic composite materials 126 into a thermoplastic composite prototype part 44 using the one or more discardable freeform tooling elements 24. Preferably, the thermoplastic composite materials 126 and thermoplastic composite part 44 are fiber-reinforced. Forming the thermoplastic composite materials 126 into a thermoplastic composite prototype part 44 is preferably achieved by operating a thermoplastic part forming process 116, comprising a thermoplastic stamp forming process 118 or a thermoforming process 122, as discussed above. Preferably, the thermoplastic composite prototype part 44 has a complex geometry.

The method 300 further comprises step 308 of separating the thermoplastic composite prototype part 44 from the one or more discardable freeform tooling elements 24. The separating step 310 may comprise a separating process 162 such as a manual process, a water soluble system process, or a chemical process that uses a separating element 164, as discussed above. The method 300 may further comprise optional step 310 of finishing one or more surfaces 182 (see FIG. 15) of the thermoplastic composite prototype part 44 to obtain desired surface characteristics. The method 300 reduces inventory 28 (see FIG. 4B) and inventory storage space 30 (see FIG. 4B) for the one or more discardable freeform tooling elements 24.

Figure 18:
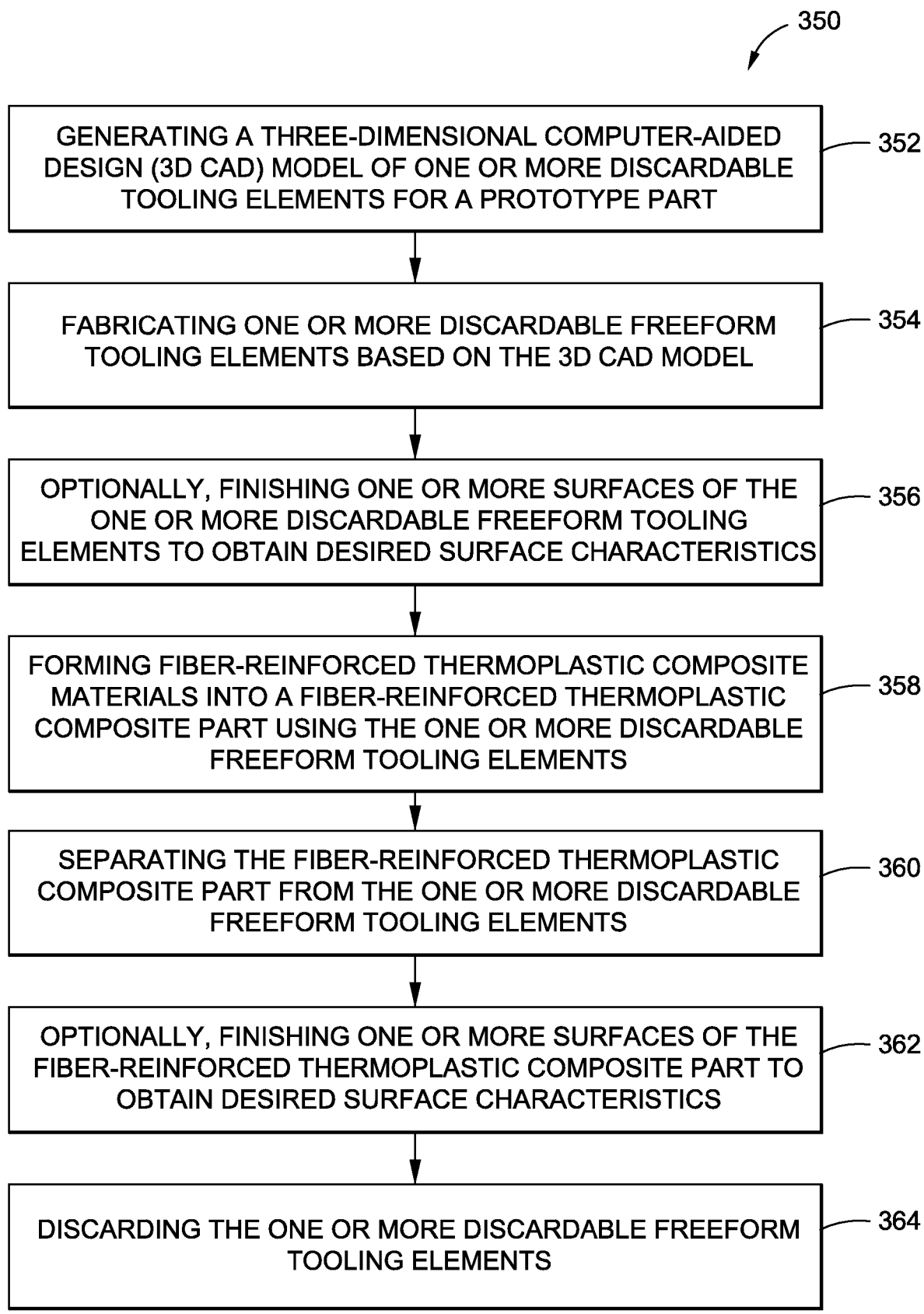
FIG. 18 is an illustration of a flow diagram of another one of the embodiments of a method of the disclosure.

FIG. 18 is an illustration of a flow diagram of another one of the embodiments of a method 350 for prototyping a fiber-reinforced thermoplastic composite part 45 (see FIG. 15). The method 350 comprises step 352 of generating a three-dimensional computer-aided design (3D CAD) model 42 of one or more discardable tooling elements 25 for a prototype part 23 (see FIG. 4B).

The method 350 further comprises step 354 of fabricating one or more discardable freeform tooling elements 24 based on the 3D CAD model 42 Preferably, the discardable freeform tooling elements 24 are fabricated by operating a rapid manufacturing process 58. The rapid manufacturing process 58 may comprise additive manufacturing (AM), direct digital manufacturing (DDM), three-dimensional printing (3DP), selective laser sintering (SLS), fused deposition modeling (FDM), stereolithography (SLA) or another suitable rapid manufacturing process. The method 350 may further comprise optional step 356 of finishing one or more surfaces 114a, 114b (see FIG. 8) of the one or more discardable freeform tooling elements 24 to obtain desired surface characteristics.

The method 350 further comprises step 358 of forming fiber-reinforced thermoplastic composite materials 128 into a fiber-reinforced thermoplastic composite part 45 using the one or more discardable freeform tooling elements 24 based on the 3D CAD model 42. Preferably, the fiber-reinforced thermoplastic composite materials 128 are formed into the fiber-reinforced thermoplastic composite part 45 using the one or more discardable freeform tooling elements 24 by operating a thermoplastic part forming process 116 comprising a thermoplastic stamp forming process 118 or a thermoforming process 122, or another suitable process, as discussed above. Preferably, the fiber-reinforced thermoplastic composite part 45 is a fiber-reinforced thermoplastic composite prototype part.

The method 350 further comprises step 360 of separating the fiber-reinforced thermoplastic composite part 45 from the one or more discardable freeform tooling elements 24. The separating step 360 may comprise a manual process, a water soluble system process, or a chemical process, as discussed above. The method 350 may further comprise optional step 362 of finishing one or more surfaces 182 of the fiber-reinforced thermoplastic composite part 45 to obtain desired surface characteristics, as discussed above.

The method 350 further comprises step 364 of discarding the one or more discardable freeform tooling elements 24, resulting in reduced inventory 29 (see FIG. 4C) and reduced inventory storage space 31 (see FIG. 4C) of the one or more discardable freeform tooling elements 24.

Figure 19:
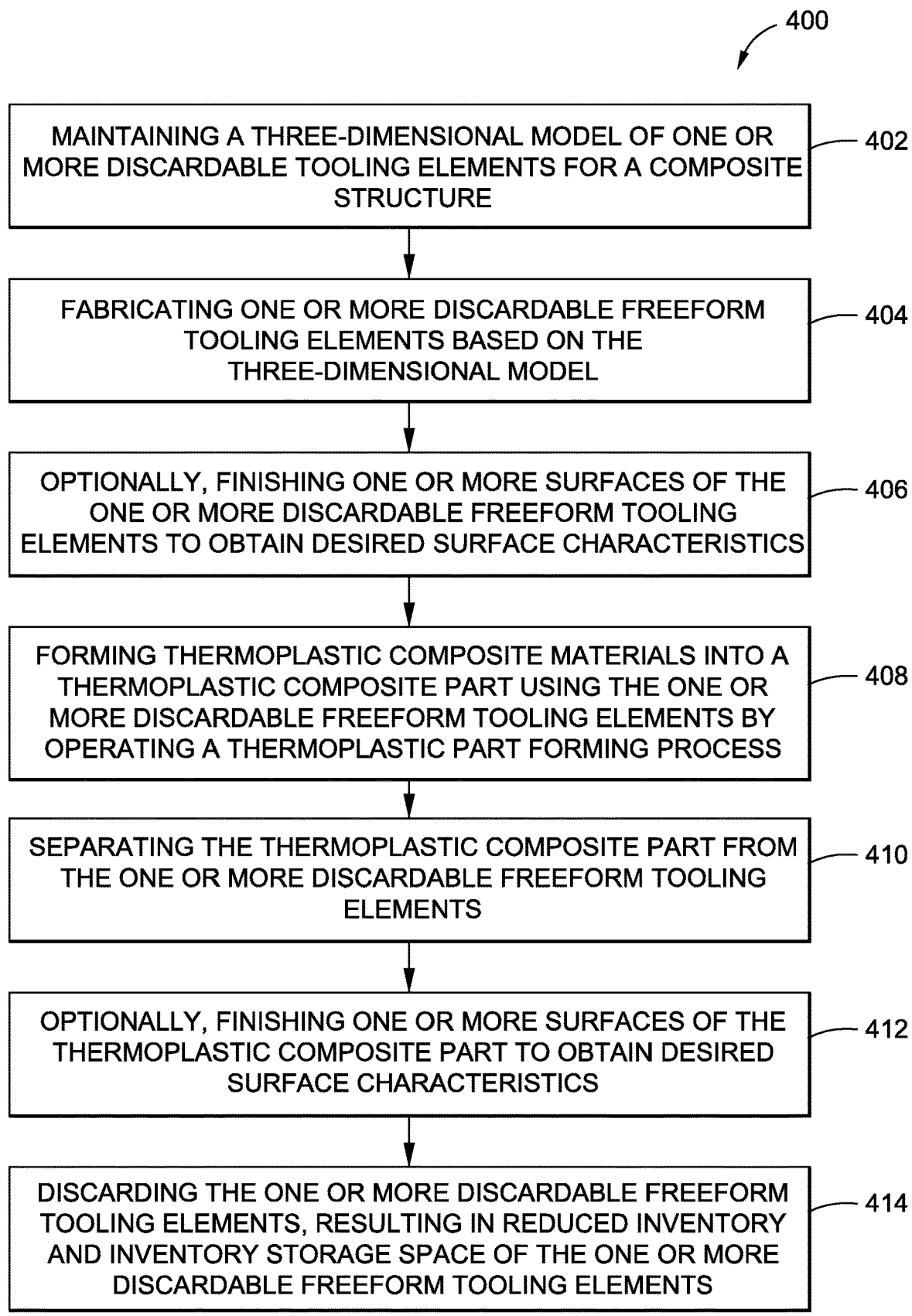
FIG. 19 is an illustration of a flow diagram of another one of the embodiments of a method of the disclosure.

FIG. 19 is an illustration of a flow diagram of one of the embodiments of a method 400 of the disclosure for reducing inventory 28 (see FIG. 4B) and inventory storage space 30 (see FIG. 4B) for one or more discardable freeform tooling elements 24 used in the manufacture of prototype parts for thermoplastic composite parts 22. The method 400 comprises step 402 of maintaining a three-dimensional model 38 of one or more discardable tooling elements 25 for a composite structure or part. Preferably, the three-dimensional model 38 is maintained as a digital data file 36.

The method 400 further comprises step 404 of fabricating the one or more discardable freeform tooling elements 24 based on the three-dimensional model 38. Preferably, the one or more discardable freeform tooling elements 24 are formed by operating a rapid manufacturing process 58. The rapid manufacturing process 58 may comprise additive manufacturing (AM), direct digital manufacturing (DDM), three-dimensional printing (3DP), selective laser sintering (SLS), fused deposition modeling (FDM), stereolithography (SLA) or another suitable rapid manufacturing process. The discardable freeform tooling element 24 may be comprised of ceramics such as silica based aggregates, powdered aluminous silica with silicate and polymer binder, aluminum silicates, alumina, and other suitable ceramics; metals such as metal powders and other suitable metals; polymers such as polymer powders and other suitable polymer materials, or another suitable material. Preferably, the discardable freeform tooling element 24 comprises a soluble ceramic material such as powdered aluminous silica with silicate and polymer binder. Preferably, the soluble ceramic material allows for the creation of an interior three-dimensional volume 108 within the prototype part 22.

The method 400 may further comprise optional step 406 of finishing one or more surfaces 114a, 114b of the one or more discardable freeform tooling elements 24 to obtain desired surface characteristics, as discussed above. The method 400 further comprises step 408 of forming thermoplastic composite materials 126 into a thermoplastic composite part 22 using the one or more discardable freeform tooling elements 24 by operating a thermoplastic part forming process 116. The thermoplastic part forming process 116 may comprise a thermoplastic stamp forming process 118 or a thermoforming process 122, as discussed above, or another suitable thermoplastic part forming process. Preferably, the thermoplastic composite materials 126 and thermoplastic composite part 22 are fiber-reinforced.

The method 400 further comprises step 410 of separating the thermoplastic composite part 22 from the one or more discardable freeform tooling elements 24. The separating step 408 may comprise a manual process, a water soluble system process, or a chemical process, as discussed above. The method 400 may further comprise optional step 412 of finishing one or more surfaces 182 of the thermoplastic composite part 22 to obtain desired surface characteristics, as discussed above. The method 400 further comprises step 414 of discarding the one or more discardable freeform tooling elements 24. This preferably results in a reduced inventory 29 (see FIG. 4C) and reduced inventory storage space 31 (see FIG. 4C) of the one or more discardable freeform tooling elements 24.

The method 400 facilitates the manufacture of a low quantity of thermoplastic composite parts 22 without incurring increased tooling costs and increased lead time. Preferably, the method 400 can produce the three-dimensional thermoplastic composite prototype part 44 within a 48-hour time period. The three-dimensional thermoplastic composite prototype part 44 may be used as a prototype part in the manufacture of composite structures 20 such as aircraft 10. The three-dimensional thermoplastic composite prototype part 44 may also be used in the manufacture of composite structures used in articles comprising spacecraft, rotorcraft, watercraft, automobiles, trucks, sporting goods, windmills, tubing and ducting used in petrochemical systems, medical devices, or other suitable articles.

In another embodiment of the disclosure, there is provided a thermoplastic composite part 22 that is preferably a thermoplastic composite prototype part 44 that is three-dimensional and has a complex geometry. Preferably, the thermoplastic composite part 22 is used in the manufacture of a composite structure 20, such as composite structure 20 used in aircraft 10. However, the composite structure may also be used in articles such as spacecraft, rotorcraft, watercraft, automobiles, trucks, sporting goods, windmills, tubing and ducting used in petrochemical systems, and medical devices. The thermoplastic composite part 22 is preferably manufactured by the one of the disclosed embodiments of methods 300, 350, and 400, discussed above. Preferably, the thermoplastic composite part 22 may be used in fire resistant applications.

One or more of the embodiments of the methods and systems of the disclosure provides numerous advantages. The disclosed embodiments provide for methods and systems using freeform or molded tooling that may be soluble, insoluble, or both, within the process of manufacturing stamp formed thermoplastic composites parts. The disclosed embodiments may also be applied to other thermoplastic and thermoset processes depending on the desired materials chosen and by matching temperature profiles. The disclosed embodiments provide for methods and systems that allow for the manufacture of three-dimensional composite parts which can offer superior stiffness, decreased cost and weight, and can be produced at a very high rate. The discardable freeform tooling elements 24 and cores 46, if present, may be removed through dissolution, mechanically removed, or left in as flyaway features on parts. The disclosed embodiments provide for methods and systems that allow for prototype parts of high geometric complexity to be manufactured at a low cost and using quickly produced discardable freeform tooling elements made by a rapid manufacturing process, preferably 3DP. The use of 3DP, with materials capable of performing all thermal, chemical and mechanical work required of the stamp forming process, can facilitate low volume stamp formed part production without incurring high tooling costs and lead times. Stamp forming is an inherently fast process, once tooling is obtained, so the ability to produce tooling at a fast pace can reduce overall lead time. The disclosed methods and systems may also be used for more rapid technology development by enabling low cost rapid tooling.

A key feature is that the discardable freeform tooling elements 24 may be internal to the thermoplastic composite part or thermoplastic composite prototype part, and unlike known bladder forming techniques, can be easily removed by dissolving the discardable freeform tooling elements 24 and cores 46, if present. The thermoplastic composite part design can also be designed with a much greater degree of control than a bladder molded type of part. The use of soluble tooling detail in the discardable freeform tooling elements 24 used in the disclosed methods and systems allows for the creation of undrafted or trapped three-dimensional geometry inside a stamp formed prototype part.

The disclosed embodiments provide for methods and systems that have the capability to progress from 3D CAD to a completed, freeform geometry and a thermoplastic prototype part within a 48-hour time period. Current, commercially available 3DP machines are capable of building tooling details of a size reaching 1.8 m (meter)×1.0 m×0.7 m (70" (inches)×39"×27") in under 35 hours. Stamp forming of thermoplastic composites has distinct advantages such as low processing time because no auto-clave cure is necessary during post-forming. The stamp forming process can go from prepreg blank to near net-shape parts in less than ten (10) minutes. The ability to create soluble discardable freeform tooling elements can allow for the creation of high performance, draft independent, increasingly non-planar, freeform shape parts, which can allow for component weight reduction.

The disclosed embodiments provide for methods and systems that can allow for the manufacture of high strength, lightweight thermoplastic reinforced parts that can be made in complex geometric shapes, thus reducing product weight and cost. The disclosed embodiments provide for methods and systems that can reduce assembly costs, part count, the number of processing steps, inventory of discardable freeform tooling elements, and inventory storage space for discardable freeform tooling elements. The disclosed embodiments provide for methods and systems that can increase flexibility in design of parts due to rapid manufacturing processes comprising additive layer manufacturing processes. The disclosed embodiments provide for methods and systems that can reduce cost and lead time for stamp forming tools. The disclosed embodiments provide for methods and systems that can allow for components to be made in-house with low capital requirements. Additionally, the use of stamp forming material, such as thermoplastic prepreg material, that is inherently fire resistant or flame retardant can allow for the usage of thermoplastic composite parts in applications previously unachievable due to FAA requirements.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A method of prototyping a thermoplastic composite part, the method comprising:
   three-dimensional printing (3DP) discardable freeform tooling elements consisting of a soluble mold comprised of a first portion and a second portion, and a soluble core, wherein the soluble mold and the soluble core are solid and consist of a soluble ceramic material, the soluble ceramic material consisting of powdered aluminous silica with silicate and polymer binder;
   heating a first prepreg sheet and a second prepreg sheet in a heating element, until the first prepreg sheet and the second prepreg sheet are pliable;
   forming a stamp form part assembly comprising, in succession, the first portion of the soluble mold, the first prepreg sheet that is pliable, the soluble core, the second prepreg sheet that is pliable, and the second portion of the soluble mold, wherein the first prepreg sheet forms around contours of a first molded side of the first portion of the soluble mold and around a bottom portion of the soluble core, and further wherein the second prepreg sheet forms around contours of a first molded side of the second portion of the soluble mold and around a top portion of the soluble core;
   stamp forming the stamp form part assembly in a stamp forming apparatus using a thermoplastic part forming process comprising a thermoplastic stamp forming process to form thermoplastic composite materials into the thermoplastic composite part, the soluble core being internal to the thermoplastic composite part; and
   separating the thermoplastic composite part from the soluble mold, and removing the soluble core from the thermoplastic composite part through dissolution.

2. The method of claim 1, further comprising finishing one or more surfaces of the thermoplastic composite part to obtain desired surface characteristics.

3. The method of claim 1, further comprising after three-dimensional printing (3DP) the discardable freeform tooling elements, finishing one or more surfaces of the discardable freeform tooling elements to obtain desired surface characteristics.

4. The method of claim 1, wherein the three-dimensional printing (3DP) of the discardable freeform tooling elements is based on a digital data file that represents a three-dimensional model of the discardable freeform tooling elements.

5. A method of prototyping a thermoplastic composite part, the method comprising:
   three-dimensional printing (3DP) discardable freeform tooling elements comprising a soluble mold comprised of a first portion and a second portion, and a soluble core, wherein the soluble mold and the soluble core are solid and consist of a soluble ceramic material, the soluble ceramic material consisting of powdered aluminous silica with silicate and polymer binder;
   heating a first prepreg sheet and a second prepreg sheet in a heating element, until the first prepreg sheet and the second prepreg sheet are pliable;
   forming a stamp form part assembly comprising, in succession, the first portion of the soluble mold, the first prepreg sheet that is pliable, the soluble core, the second prepreg sheet that is pliable, and the second portion of the soluble mold, wherein the first prepreg sheet forms around contours of a first molded side of the first portion of the soluble mold and around a bottom portion of the soluble core, and further wherein the second prepreg sheet forms around contours of a first molded side of the second portion of the soluble mold and around a top portion of the soluble core;
   stamp forming the stamp form part assembly in a stamp forming apparatus using a thermoplastic part forming process comprising a thermoplastic stamp forming process to form thermoplastic composite materials into the thermoplastic composite part, the soluble core being internal to the thermoplastic composite part, and the stamp forming apparatus applying a pressure to the stamp form part assembly in a range of from 100 psi (pounds per square inch) to 900 psi; and
   separating the thermoplastic composite part from the mold and removing the soluble core from the thermoplastic composite part through dissolution.

6. The method of claim 1, wherein the discardable freeform tooling elements allow for the creation of an interior three-dimensional volume within the thermoplastic composite part.

7. The method of claim 1, wherein the method reduces inventory and inventory storage space for the discardable freeform tooling elements.

8. The method of claim 1, wherein the thermoplastic composite materials and thermoplastic composite part are fiber-reinforced.

9. The method of claim 1, wherein the soluble ceramic material of the soluble mold and the soluble core is soluble in water.

10. The method of claim 1, wherein operating the thermoplastic part forming process further comprises heating the thermoplastic composite materials so that the thermoplastic composite materials are pliable around contours of the mold and the core.

11. The method of claim 10, wherein the thermoplastic composite materials comprise pre-consolidated laminates heated up to about 120° C. (Celsius) above a glass transition temperature ($T_g$) of a polymer matrix of the pre-consolidated laminates.

12. A method of prototyping a fiber-reinforced thermoplastic composite part, the method comprising:
generating a three-dimensional computer-aided design (3D CAD) model of discardable tooling elements for a prototype part;
three-dimensional printing (3DP) discardable freeform tooling elements based on the 3D CAD model, the discardable freeform tooling elements consisting of a soluble mold comprised of a first portion and a second portion, and a soluble core, wherein the soluble mold and the soluble core are solid and consist of a soluble ceramic material, the soluble ceramic material consisting of powdered aluminous silica with silicate and polymer binder;
heating a first prepreg sheet and a second prepreg sheet in a heating element, until the first prepreg sheet and the second prepreg sheet are pliable;
forming a stamp form part assembly comprising, in succession, the first portion of the soluble mold, the first prepreg sheet that is pliable, the soluble core, the second prepreg sheet that is pliable, and the second portion of the soluble mold, wherein the first prepreg sheet forms around contours of a first molded side of the first portion of the soluble mold and around a bottom portion of the soluble core, and further wherein the second prepreg sheet forms around contours of a first molded side of the second portion of the soluble mold and around a top portion of the soluble core;
stamp forming the stamp form part assembly in a stamp forming apparatus using a thermoplastic part forming process comprising a thermoplastic stamp forming process, to form fiber-reinforced thermoplastic composite materials into the fiber-reinforced thermoplastic composite part;
separating the fiber-reinforced thermoplastic composite part from the soluble mold and removing the soluble core from the fiber-reinforced thermoplastic composite part through dissolution; and
discarding the discardable freeform tooling elements.

13. The method of claim 12, further comprising after separating the fiber-reinforced thermoplastic composite part, finishing one or more surfaces of the fiber-reinforced thermoplastic composite part to obtain desired surface characteristics.

14. The method of claim 12, further comprising after three-dimensional printing (3DP) the discardable freeform tooling elements, finishing one or more surfaces of the discardable freeform tooling elements to obtain desired surface characteristics.

15. The method of claim 12, wherein the soluble core is in a form of a tube.

16. The method of claim 12, wherein the thermoplastic part forming process is the thermoplastic stamp forming process.

17. The method of claim 12, wherein the discardable freeform tooling elements allow for the creation of an interior three-dimensional volume within the fiber-reinforced thermoplastic composite part.

18. The method of claim 12, wherein the soluble ceramic material of the soluble mold and the soluble core is soluble in water.

19. The method of claim 12, wherein operating the thermoplastic part forming process further comprises heating the fiber-reinforced thermoplastic composite materials so that the fiber-reinforced thermoplastic composite materials are pliable around contours of the mold and the core.

20. The method of claim 19, wherein the fiber-reinforced thermoplastic composite materials comprise pre-consolidated laminates heated up to about 120° C. (Celsius) above a glass transition temperature ($T_g$) of a polymer matrix of the pre-consolidated laminates.

* * * * *